United States Patent
Sata et al.

(10) Patent No.: US 7,822,536 B2
(45) Date of Patent: Oct. 26, 2010

(54) START-UP CONTROL DEVICE FOR INTERNAL COMBUSTION ENGINE

(75) Inventors: Kota Sata, Susono (JP); Koichi Ueda, Susono (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 47 days.

(21) Appl. No.: 12/304,700

(22) PCT Filed: Jun. 13, 2007

(86) PCT No.: PCT/JP2007/062356

§ 371 (c)(1),
(2), (4) Date: Dec. 12, 2008

(87) PCT Pub. No.: WO2007/145360

PCT Pub. Date: Dec. 21, 2007

(65) Prior Publication Data

US 2009/0199818 A1   Aug. 13, 2009

(30) Foreign Application Priority Data

Jun. 13, 2006 (JP) .............................. 2006-163390

(51) Int. Cl.
*F02D 41/00* (2006.01)

(52) U.S. Cl. ............... 701/113; 123/179.5; 123/406.47; 123/406.53; 123/491

(58) Field of Classification Search ......... 701/103–105, 701/110, 113; 123/179.5, 179.16, 179.17, 123/406.47, 406.53, 406.54, 406.58, 478, 123/480, 491

See application file for complete search history.

(56) References Cited

U.S. PATENT DOCUMENTS 4,889,095 A * 12/1989 Sogawa .................. 123/406.47

(Continued)

FOREIGN PATENT DOCUMENTS

EP          1 178 203 A2      2/2002

(Continued)

OTHER PUBLICATIONS

Fu-Chang Song, et al.: "Maintenance of Electronic Ignition circuit for Modern Automobile"; published by Defense Industry Publisher, Beijing, China, Jan. 2002; discloses control of the engine speed by advancing/retarding the ignition timing.

*Primary Examiner*—Stephen K Cronin
*Assistant Examiner*—Johnny H Hoang
(74) *Attorney, Agent, or Firm*—Kenyon & Kenyon, LLP

(57) ABSTRACT

In a speed transition period from when an internal combustion engine is started to when an engine speed settles down to a certain speed, a compression top dead center of a cylinder first operating is set as a reference crank angle and compression top dead centers of the cylinders arriving successively after said reference crank angle in the speed transition period are set as judgment use crank angles. Reference crank angle advancing times are detected and stored in advance, wherein the reference crank angle advancing times are crank angle advancing times when a reference fuel is used, and the crank angle advancing times are times required for the crank angle to advance from the reference crank angle to the judgment use crank angles. The actual crank angle advancing times are detected. When an actual crank angle advancing time is shorter than the reference crank angle advancing time, the ignition timing is retarded by an amount corresponding to a difference of the actual crank angle advancing time from the reference crank angle advancing time. When the actual crank angle advancing time is longer than the reference crank angle advancing time, the ignition timing is advanced by an amount corresponding to the difference.

36 Claims, 16 Drawing Sheets

U.S. PATENT DOCUMENTS

| | | | |
|---|---|---|---|
| 5,402,763 A * | 4/1995 | Saito et al. | 123/491 |
| 5,711,272 A | 1/1998 | Maegawa et al. | |
| 5,735,241 A * | 4/1998 | Matsuura | 123/305 |
| 5,817,923 A | 10/1998 | Ohsaki et al. | |
| 5,950,419 A * | 9/1999 | Nishimura et al. | 60/274 |
| 6,379,284 B1 * | 4/2002 | Hanai et al. | 477/200 |
| 6,467,456 B2 * | 10/2002 | Shidara et al. | 123/406.54 |
| 6,659,069 B2 * | 12/2003 | Shiraishi et al. | 123/298 |
| 6,742,502 B2 * | 6/2004 | Nagatsu et al. | 123/406.24 |
| 6,848,427 B2 * | 2/2005 | Song et al. | 123/486 |
| 6,945,223 B2 * | 9/2005 | Hoshi | 123/339.15 |
| 6,993,427 B2 * | 1/2006 | Ueda | 701/111 |
| 7,273,040 B2 * | 9/2007 | Shouda et al. | 123/491 |
| 2001/0015192 A1 * | 8/2001 | Urushihara et al. | 123/299 |
| 2004/0177833 A1 | 9/2004 | Murase et al. | |
| 2005/0120782 A1 * | 6/2005 | Kishibata et al. | 73/116 |
| 2005/0205057 A1 * | 9/2005 | Yamashita | 123/406.58 |

FOREIGN PATENT DOCUMENTS

| | | |
|---|---|---|
| IT | B020 040 800 A1 | 3/2005 |
| JP | 4-194348 A | 7/1992 |
| JP | 11-107838 A | 4/1999 |
| JP | 2000-97071 A | 4/2000 |
| JP | 2002-070624 A | 3/2002 |
| JP | 2004-324491 A | 11/2004 |
| JP | 2006-046164 A | 2/2006 |
| WO | 2006/067204 A1 | 6/2006 |

* cited by examiner

Fig.1
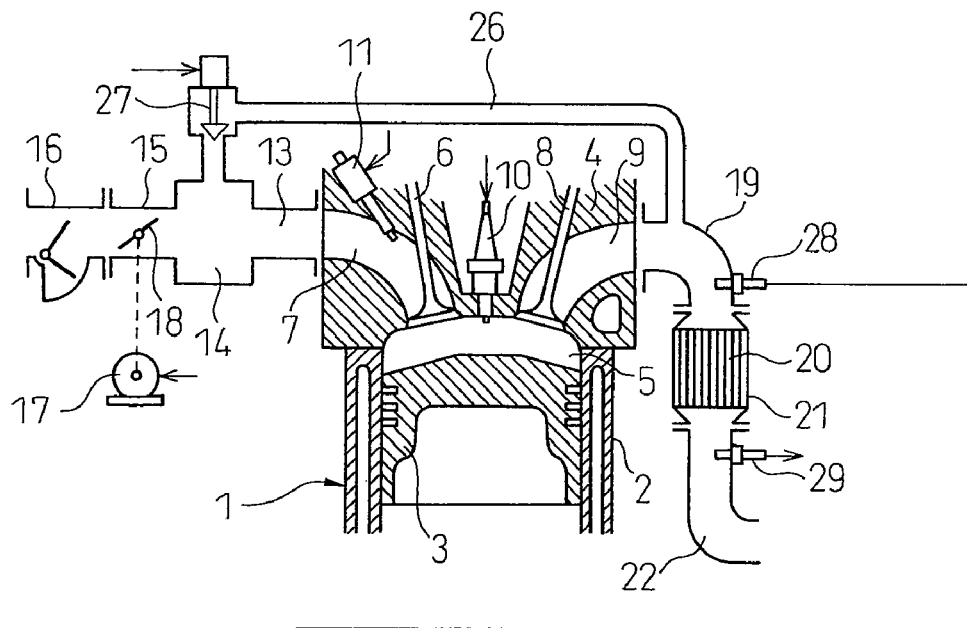
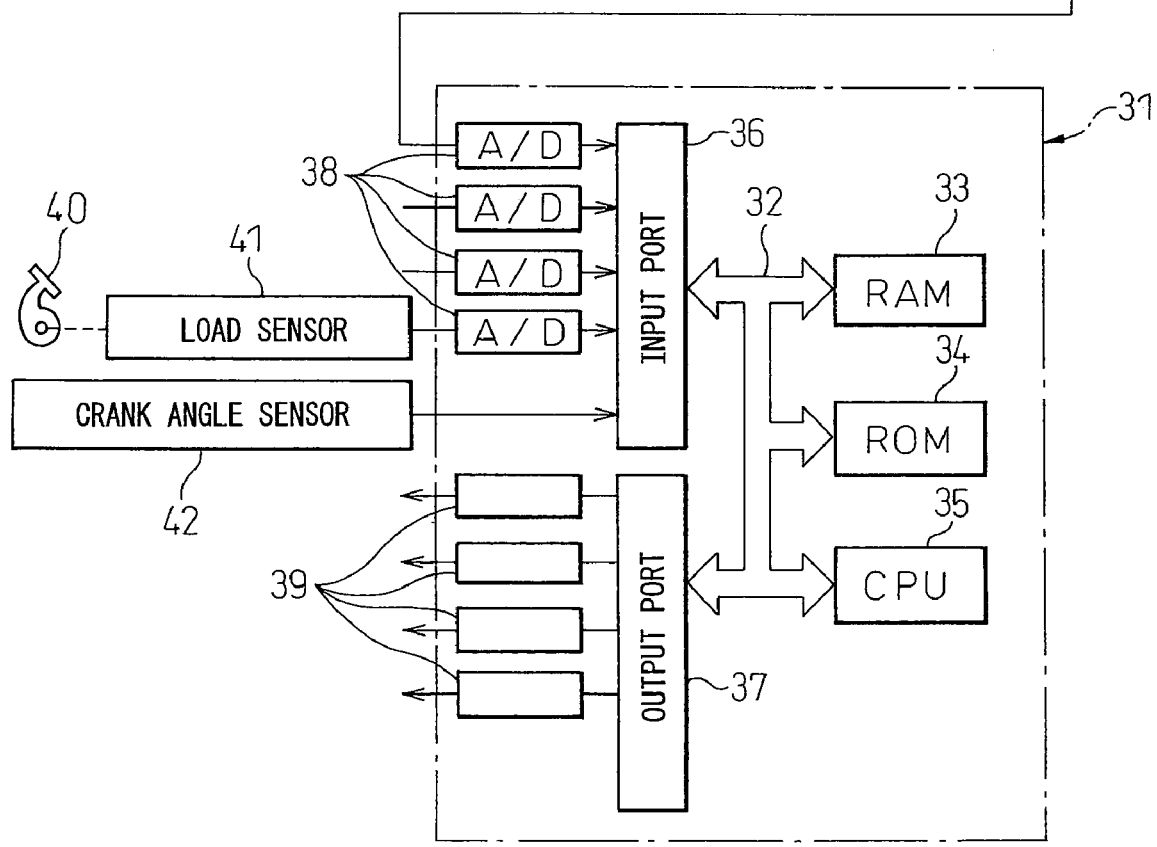

US 7,822,536 B2

START-UP CONTROL DEVICE FOR INTERNAL COMBUSTION ENGINE

This is a 371 national phase application of PCT/JP2007/062356 filed 13 Jun. 2007, claiming priority to Japanese Patent Application No. JP 2006-163390 filed 13 Jun. 2006, the contents of which are incorporated herein by reference.

FIELD OF THE INVENTION

The present invention relates to a startup control device for an internal combustion engine.

BACKGROUND OF THE INVENTION

Japanese Unexamined Patent Publication (A) No. 11-270399 describes a device for judging the property of the actually used fuel in an internal combustion engine. In this device, a difference between a time for a specific point of a crankshaft to pass a predetermined set crank angle range (specifically 30°) right after an air-fuel mixture is ignited and a time for the specific point of the crankshaft to pass through the same set crank angle range right after the air-fuel mixture is next ignited is calculated and it is judged that heavy fuel is being used when this difference exceeds a reference value.

However, in the above device, the crank angle range over which the time for passage by the specific point of the crankshaft is measured is small, so the difference in times for passage of the specific point of the crankshaft is small. Therefore, the precision of judgment of whether this difference exceeds the reference value is low. As a result, even if controlling the ignition timing for an air-fuel mixture based on the fuel property judged by this device, improvement of the fuel consumption and reduction of the exhaust emission may not be achieved as desired.

SUMMARY OF THE INVENTION

Therefore, an object of the present invention is to provide a startup control device for an internal combustion engine able to accurately judge a fuel property and control engine startup in accordance with the fuel property so as to achieve an improvement in the fuel consumption and a reduction in the exhaust emission while achieving the required torque.

According to a first aspect of the present invention, there is provided a startup control device for an internal combustion engine, comprising: a setting means for setting a specific crank angle in a speed transition period from when the internal combustion engine is started to when an engine speed settles down to a certain speed as a reference crank angle and setting a plurality of crank angles arriving successively after the reference crank angle during the speed transition period as judgment use crank angles; a storing means for detecting and storing in advance a reference crank angle advancing time, the reference crank angle advancing time being a crank angle advancing time when a reference fuel is used, the crank angle advancing being a time required for the crank angle to advance from the reference crank angle to each judgment use crank angle; a detecting means for detecting actual crank angle advancing times during the speed transition period; and a control means, which controls an ignition timing or fuel injection amount during the speed transition period, for retarding an ignition timing or reducing a fuel injection amount by an amount corresponding to a difference of the actual crank angle advancing time from the reference crank angle advancing time when the actual crank angle advancing time is shorter than the reference crank angle advancing time and for advancing the ignition timing or increasing the fuel injection amount by an amount corresponding to a difference of the actual crank angle advancing time from the reference crank angle advancing time when the actual crank angle advancing time is longer than the reference crank angle advancing time.

According to another aspect of the present invention, there is provided a startup control device for an internal combustion engine, comprising: a setting means for setting a specific crank angle in a speed transition period from when the internal combustion engine is started to when an engine speed settles down to a certain speed as a reference crank angle and setting a plurality of crank angles arriving successively after the reference crank angle during the speed transition period as judgment use crank angles; a storing means for detecting and storing in advance a reference speed rise, the reference speed rise being a speed rise when a reference fuel is used, the speed rise being an amount of rise of engine speed occurring when the crank angle advances from the reference crank angle to each judgment use crank angle; a detecting means for detecting actual speed rises during the speed transition period; and a control means, which controls an ignition timing or fuel injection amount during the speed transition period, for retarding an ignition timing or reducing a fuel injection amount by an amount corresponding to a difference of the actual speed rise from the reference speed rise when the actual speed rise is larger than the reference speed rise and for advancing the ignition timing or increasing the fuel injection amount by an amount corresponding to a difference of the actual speed rise from the reference speed rise when the actual speed rise is smaller than the reference speed rise.

Further, according to still another aspect of the present invention, there is provided a startup control device for an internal combustion engine, comprising: a setting means for setting a specific crank angle in a speed transition period from when the internal combustion engine is started to when an engine speed settles down to a certain speed as a reference crank angle and setting a plurality of crank angles arriving successively after the reference crank angle during the speed transition period as judgment use crank angles; a storing means for detecting and storing in advance an angular acceleration cumulative value when a reference fuel is used, the angular acceleration cumulative value being a value of an angular acceleration of a crankshaft at the reference crank angle to which an angular acceleration of the crankshaft at each judgment use crank angle is successively cumulatively added; a detecting means for detecting actual angular acceleration cumulative values during the speed transition period; and a control means, which controls an ignition timing or fuel injection amount during the speed transition period, for retarding an ignition timing or reducing a fuel injection amount by an amount corresponding to a difference of an actual angular acceleration cumulative value from a reference angular acceleration cumulative value when the actual angular acceleration cumulative value is larger than the reference angular acceleration cumulative value and for advancing the ignition timing or increasing the fuel injection amount by an amount corresponding to a difference of the actual angular acceleration cumulative value from the reference angular acceleration cumulative value when the actual angular acceleration cumulative value is smaller than the reference angular acceleration cumulative value.

BRIEF DESCRIPTION OF THE DRAWINGS

FIG. 1 is an overview of an internal combustion engine to which a startup control device for the present invention is applied.

DETAILED DESCRIPTION

Figure 2:
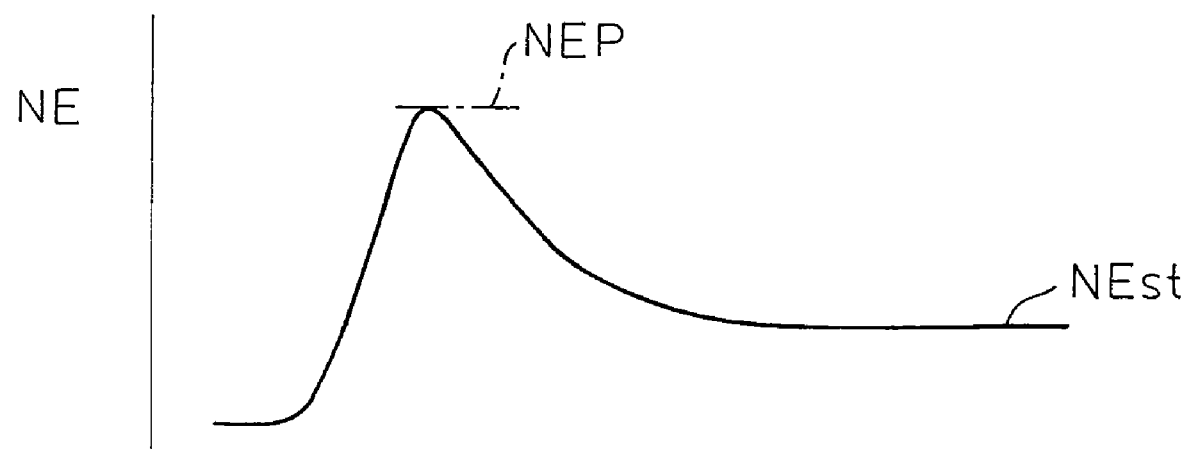
FIG. 2 is a time chart showing the trend in the engine speed at the time of engine startup.

Below, embodiments of the present invention will be explained with reference to the drawings. FIG. 1 shows a four-cylinder internal combustion engine provided with a startup control device of the present invention. In FIG. 1, 1 indicates an engine body, 2 a cylinder block, 3 a piston, 4 a cylinder head, 5 a combustion chamber, 6 an intake valve, 7 an intake port, 8 an exhaust valve, 9 an exhaust port, 10 a spark plug, and 11 a fuel injector. Each fuel injector 11 is attached to the cylinder head 4 so as to inject fuel into an intake port 7.

The intake port 7 of each cylinder is connected through a corresponding intake branch 13 to a surge tank 14. The surge tank 14 is connected through an intake duct 15 and an air flow meter 16 to an air cleaner (not shown). Inside the intake duct 15 is arranged a throttle valve 18 driven by a step motor 17. On the other hand, the exhaust port 9 of each cylinder is connected to a corresponding exhaust branch 19. The exhaust branches 19 are connected to a catalyst converter 21 housing a three-way catalyst 20. The exhaust branch 19 and the surge tank 14 are connected to each other through an exhaust gas recirculation (hereinafter referred to as a "EGR") gas conduit 26. Inside this EGR gas conduit 26, an EGR control valve 27 is arranged.

An electronic control unit 31 is comprised of a digital computer comprised of components connected through a bidirectional bus 32 such as a RAM (random access memory) 33, ROM (read only memory) 34, CPU (microprocessor) 35, input port 36, and output port 37. The air flow meter 16 generates an output voltage proportional to an intake air amount (amount of air sucked into a combustion chamber 5). This output voltage is input through a corresponding AD converter 38 to the input port 36. Further, an accelerator pedal 40 has a load sensor 41 connected to it. The load sensor 41 generates an output voltage proportional to an amount of depression of the accelerator pedal 40. This output voltage is input through a corresponding AD converter 38 to the input port 36. Further, a crank angle sensor 42 generates an output pulse each time a crankshaft rotates by for example 30°. This output pulse is input to the input port 36.

In the exhaust branch 19 upstream of the three-way catalyst 20, an air-fuel ratio sensor 28 is attached for detecting an air-fuel ratio. The output signal of this air-fuel ratio sensor 28 is input through a corresponding AD converter 38 to the input port 36. Further, an air-fuel ratio sensor 29 is arranged in the exhaust pipe 22 downstream of the three-way catalyst 20. The output signal of the air-fuel ratio sensor 29 is input through a corresponding AD converter 38 to the input port 36.

The three-way catalyst 20 simultaneously purifies the exhaust gas of its nitrogen oxides (NOx), carbon monoxide (CO), and hydrocarbons (HC) with high purification rates when its temperature is the activation temperature or more and the air-fuel ratio is near the stoichiometric air-fuel ratio. On the other hand, the three-way catalyst 20 has an oxygen absorbing/releasing ability (so-called oxygen storage ability) where it absorbs the oxygen in the exhaust gas when the air-fuel ratio is leaner than the stoichiometric air-fuel ratio and releases the absorbed oxygen when the air-fuel ratio is richer than the stoichiometric air-fuel ratio. Only when this oxygen absorbing/releasing ability is functioning normally, whether the air-fuel ratio is leaner or richer than the stoichiometric air-fuel ratio, the air-fuel ratio of the atmosphere in the three-way catalyst 20 is maintained substantially near the stoichiometric air-fuel ratio, so the exhaust gas is purified of the NOx, CO, and HC simultaneously by high purification rates.

In an internal combustion engine of an embodiment according to the present invention, each cylinder repeats an engine cycle comprised of the four strokes of an intake stroke, compression stroke, power stroke, and exhaust stroke. Further, the engine cycles of the cylinders start offset by 180° crank angles each in the order of the #1 cylinder, #3 cylinder, #4 cylinder, and #2 cylinder. Further, one engine cycle ends at a 720° crank angle.

In this regard, as shown in FIG. 2, at the time of startup of the internal combustion engine, the engine speed NE first rises and reaches the speed peak value NEP, then descends and settles down at a certain idling speed NEst. Here, if trying to make the path which the engine speed follows until the engine speed settles down at a certain speed match a predetermined path, the torque to be output from combustion of the air-fuel mixture at each cylinder, that is, the required torque, will be determined. In an embodiment according to the present invention, the required torque is set so that the path followed by the engine speed until settling down at a certain speed matches with a predetermined path. The torque actually obtained from fuel combustion, that is, the output torque, is controlled so as to match this required torque.

That is, first, the ignition timing at the most retarded side where no knocking will occur when a reference fuel (explained later) is used is found as a basic ignition timing in advance by experiments etc. In light of this, the amount of fuel injection required for making the output torque match the required torque under the basic ignition timing when a reference fuel is used is set as the target fuel injection amount for the time of engine startup. Fuel is injected from each fuel injector 3 in this target fuel injection amount.

In this regard, fuel includes everything from light to heavy ones. In general, the lighter the fuel, the higher the volatility, while the heavier the fuel, the lower the volatility. Therefore, under a lean air fuel ratio, if the fuel injection amount and ignition timing are constant, the lighter the fuel, the larger the output torque, while the heavier the fuel, the smaller the output torque. Therefore, when the target fuel injection amount is set assuming that the reference fuel is light, but the actually used fuel is heavy, the output torque will become smaller than the required torque, while if the target fuel injection amount is set assuming the reference fuel is heavy, but the actually used fuel is light, the output torque will become larger than the required torque. Whatever the case, to make the output torque match the required torque, it is necessary to change the target fuel injection amount in accordance with the fuel property.

However, in particular, in the period from when the internal combustion engine is started (that is, cranking of the internal combustion engine is started) to when the engine speed settles down at a certain speed (a so-called idling speed), that is, the speed transition period, even if trying to change the fuel injection amount so as to enable the required torque to be achieved, it is difficult to accurately control the actual fuel injection amount to the target fuel injection amount. On the other hand, even if changing the ignition timing, the output torque can be changed. Further, the ignition timing can be easily changed even during the speed transition period.

Therefore, in an embodiment according to the present invention, the ignition timing is controlled so as to make it possible to make the output torque match the required torque in accordance with the fuel property during the speed transition period. Next, this control of the ignition timing will be explained.

As explained above, under a lean air fuel ratio, if the fuel injection amount and ignition timing are the same, the output torque is larger when the fuel is light than when the fuel is heavy, so the rise in the engine speed during the speed transition period is faster when the fuel is light than when the fuel is heavy. Therefore, if setting a specific crank angle in the speed transition period as a reference crank angle and setting a plurality of crank angles successively arriving after said reference crank angle in the speed transition period as judgment use crank angles, the time required for advancing from the reference crank angle to each judgment use crank angle, that is, the crank angle advancing time, becomes longer the heavier the fuel and becomes shorter the lighter the fuel.

Therefore, if finding the crank angle advancing time when reference fuel is used as the reference crank angle advancing time in advance by experiments etc., detecting an actual crank angle advancing time, and comparing it with the corresponding reference crank angle advancing times, the property of the actually used fuel will be understood. That is, if the actual crank angle advancing time is substantially equal to the reference crank angle advancing time, the property of the actually used fuel is substantially equal to the property of the reference fuel. On the other hand, if the actual crank angle advancing time is shorter than the reference crank angle advancing time, the actually used fuel is lighter than the reference fuel. The shorter the actual crank angle advancing time, the lighter the actually used fuel. As opposed to this, if the actual crank angle advancing time is longer than the reference crank angle advancing time, the actually used fuel is heavier than the reference fuel. The longer the actual crank angle advancing time, the heavier the actually used fuel.

The reference fuel may be made from any fuel, but in an embodiment according to the present invention, it is made from the heaviest fuel among the fuels envisioned as being used in the internal combustion engine. In this case, the actual crank angle advancing time becomes substantially equal to the reference crank angle advancing time or shorter than the reference crank angle advancing time. In light of this, when the actual crank angle advancing time is substantially equal to the reference crank angle advancing time, the ignition timing is set to the basic ignition timing, that is, the ignition timing is not corrected. On the other hand, when the actual crank angle advancing time is shorter than the corresponding reference crank angle advancing time, the ignition timing is retarded from the basic ignition timing by an amount corresponding to the difference of the actual crank angle advancing time from the reference crank angle advancing time. As a result, it is possible to make the output torque match the required torque in accordance with the fuel property during the speed transition period.

That is, in an embodiment according to the present invention, the ignition timing SA in the speed transition period is calculated based on the following formula:

$$SA = SAB + K \cdot DP(i) \ (i=1, 2, \ldots)$$

Here, SAB indicates the above-mentioned basic ignition timing, K indicates a retarding correction coefficient ($K \geqq 0$) which is constant, and DP(i) indicates a difference of the i-th actual crank angle advancing time from the i-th reference crank angle advancing time.

In this case, the retarding correction amount dSA(i) (=K·DP(i)) of the ignition timing SA calculated when the crank angle reaches the i-th judgment use crank angle becomes larger as the difference DP(i) becomes larger and thereby the ignition timing SA is further retarded. Note that when correction is not performed, the retarding correction coefficient K is set to zero. Further, the basic ignition timing SAB is stored in advance in the ROM 34.

Figure 3:
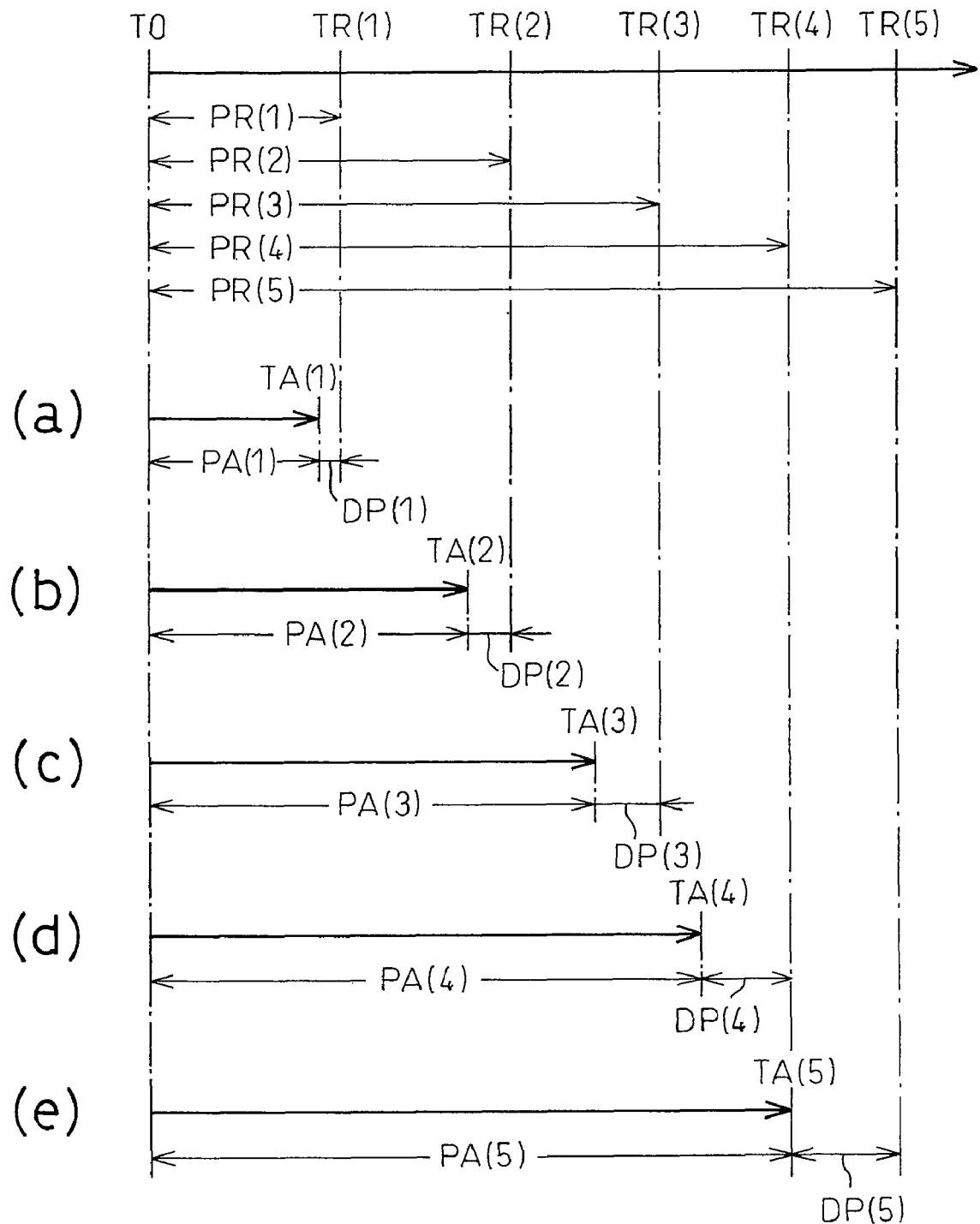
FIG. 3 is a time chart for explaining the control of the ignition timing in an embodiment according to the present invention.

The control of the ignition timing of an embodiment according to the present invention will be further explained while referring to FIG. 3.

In FIG. 3, TO shows the time at which the crank angle is at the reference crank angle. Further, TR(i) show the times when the crank angles are at the i-th judgment use crank angles when the reference fuel is used, while PR(i) show the times required for the crank angle to advance from the reference crank angle to the i-th judgment use crank angles when reference fuel is used, that is, the i-th reference crank angle advancing times (i=1, 2, ... ). Furthermore, TA(i) show the times when the crank angle is actually at the i-th judgment use crank angles, while PA(i) show the times required for the crank angle to actually advance from the reference crank angle to the i-th judgment use crank angles, that is, the i-th actual crank angle advancing times. Note that, as explained above, the i-th reference crank angle advancing times PR(i) are found in advance and are stored in the ROM 34.

As shown in (a) in FIG. 3, when the actual crank angle reaches the first judgment use crank angle, the first actual crank angle advancing time PA(1) is detected, and the difference DP(1) of the first actual crank angle advancing time PA(1) from the first reference crank angle advancing time PR(1) is calculated (DP(1)=PR(1)−PA(1)). Next, the ignition timing SA is calculated from the above formula.

Next, as shown in (b) in FIG. 3, when the actual crank angle reaches the second judgment use crank angle, in the same way, the second actual crank angle advancing time PA(2) is detected, the difference DP(2) is calculated (DP(2)=PR(2)−PA(2)), and the difference DP(2) is used to calculate the ignition timing SA. This ignition timing SA is used for the ignition action. Next, as shown in (c) to (e) in FIG. 3, when the actual crank angle respectively reaches the third, fourth, and fifth judgment use crank angles, the actual crank angle advancing times PA(3), PA(4), and PA(5) are respectively detected, the differences DP(3), DP(4), and DP(5) are respectively calculated, and the ignition timing SA is calculated.

Figure 4:
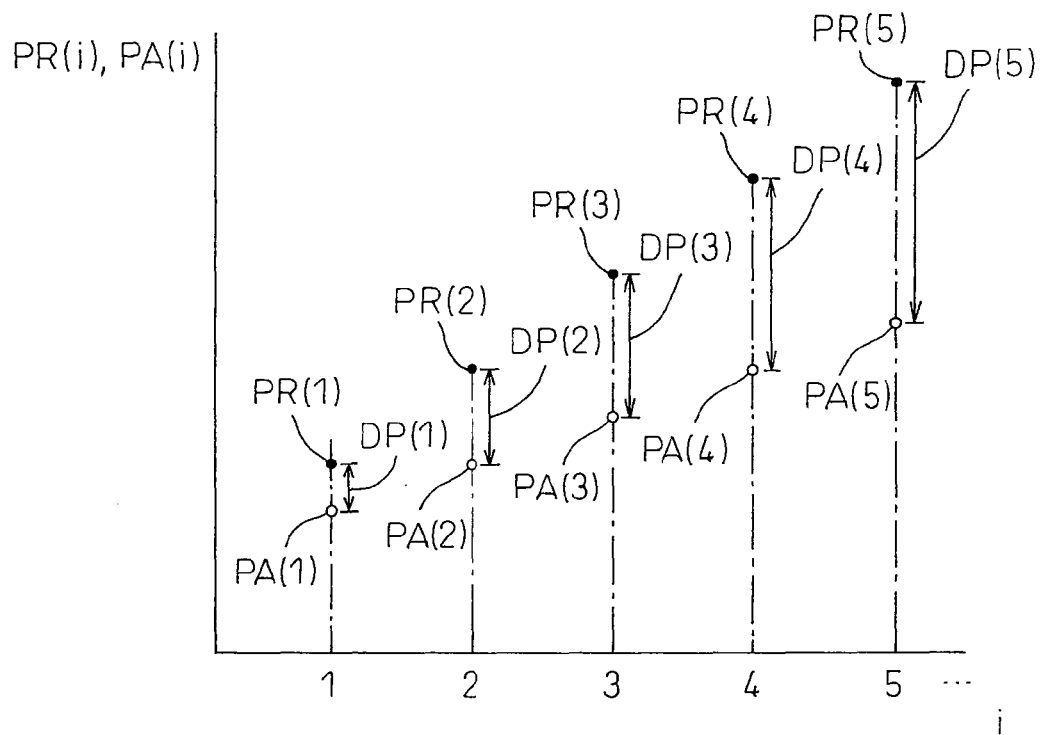
FIG. 4 is a graph showing a reference crank angle advancing time and actual crank angle advancing time.

If showing the actual crank angle advancing time PA(i) and reference crank angle advancing time PR(i) with the number of times of detection i of the actual crank angle advancing time PA(i) plotted on the abscissa, the result becomes like in FIG. 4.

Whatever the case, each time the crank angle reaches an i-th judgment use crank angle, the actual crank angle advancing time PA(i) is detected, the difference DP(i) is calculated, and the ignition timing SA is corrected in accordance with the difference DP(i).

Figure 5:
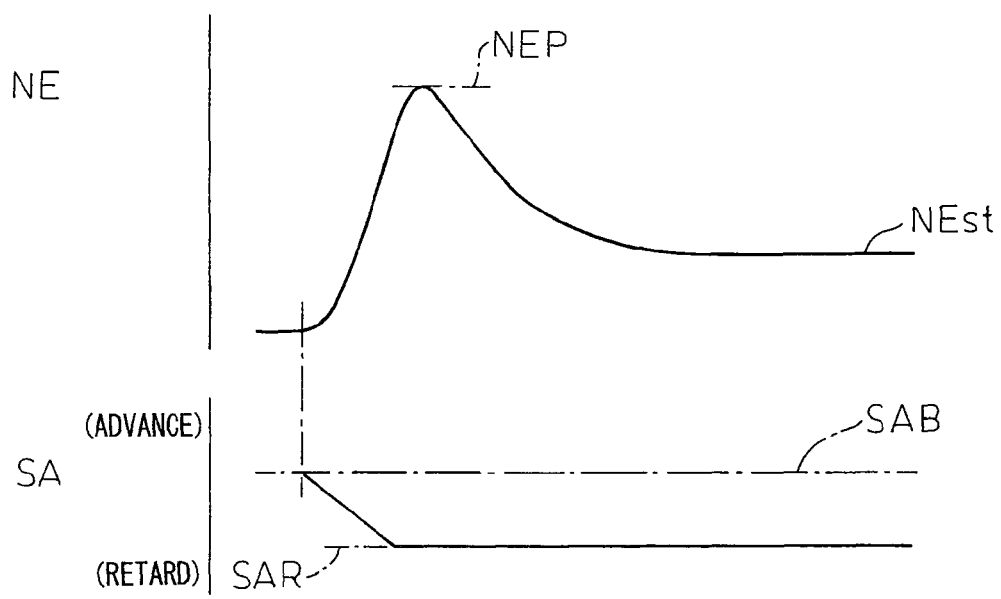
FIG. 5 is a time chart showing trends in the engine speed and ignition timing at the time of engine startup.

In the example shown in FIG. 3 and FIG. 4, the difference DP(i) becomes larger as the number of times of detection i of the actual crank angle advancing time PA(i) becomes larger and therefore the ignition timing SA, as shown in FIG. 5, is retarded along with the elapse of time.

Note that if excessively correcting the ignition timing to advance it, knocking occurs, while if excessively correct it to retard it, the generated energy can no longer be effectively used for driving the engine. Therefore, in an embodiment according to the present invention, when the calculated ignition timing SA is corrected to advance it exceeding the advanced side limit value, the ignition timing SA is returned to the advanced side limit value, while when the calculated ignition timing SA is corrected to retard it exceeding the retarded side limit value SAR, the ignition timing SA is returned to the retarded side limit value SAR as guard processing. In the example of FIG. 5, a little while after correction of the ignition timing SA is started, the ignition timing SA is held at the retarded side limit value SAR by the guard processing.

Therefore in an embodiment according to the present invention, during the speed transition period, even if the actually used fuel is not the reference fuel, it is possible to make the output torque match the required torque. In particular, in an embodiment according to the present invention, not the time required for the crank angle to advance from the previous judgment use crank angle to the next judgment use crank angle, but the time required for the crank angle to advance from the reference crank angle to a judgment use crank angle, that is, the crank angle advancing time PA(i), is detected. For this reason, it is possible to reduce the effects of outside disturbances on the detection of the crank angle advancing time and possible to precisely detect the crank angle advancing time.

Further, the difference DP(i) of the actual crank angle advancing time PA(i) from the reference crank angle advancing time PR(i) expresses the difference of the property of the actually used fuel from the property of the reference fuel. Therefore, according to an embodiment according to the present invention, it becomes possible to accurately control the ignition timing in accordance with the difference of the property of the actually used fuel from the property of the reference fuel.

Further, as will be understood from the above explanation, in an embodiment according to the present invention, the heavier the actually used fuel, the more the ignition timing is advanced. As a result, the combustion becomes stable and the combustion efficiency becomes higher. Therefore, the amount of fuel consumed to make the output torque match the required torque can be reduced. If the fuel injection amount were not reduced, the output torque would increase by the extent of the higher combustion efficiency, and the drive of the internal combustion engine could be stabilized faster after the start of the internal combustion engine.

On the other hand, when the actually used fuel is lighter than the reference fuel, the ignition timing is retarded, so the temperature of the exhaust gas rises. Therefore, as shown in FIG. 1, when an exhaust purification catalyst such as a three-way catalyst is arranged in the exhaust pipe, the temperature of this exhaust purification catalyst can be quickly raised to the activation temperature. Therefore, the exhaust emission can be reduced. Further, when the actually used fuel is lighter than the reference fuel, the ignition timing is successively retarded at each cylinder with each ignition action. That is, each cylinder is set with a suitable ignition timing for achieving the required torque and reducing the exhaust emission. Therefore, even if the fuel injection amounts of the four cylinders are set the same, it is possible to achieve the required torque and possible to reduce the exhaust emission.

The reference crank angle and judgment use crank angles may be set for all sorts of crank angles. In an embodiment according to the present invention, the compression top dead center of the cylinder where the air-fuel mixture is first burned in a speed transition period is set as the reference crank angle, while the compression top dead centers of the cylinders arriving successively after the reference crank angle are set as the judgment use crank angles. In other words, a crank angle corresponding to the reference crank angle is set in each engine cycle performed after the reference crank angle. Note that it is also possible to set a crank angle before the air-fuel mixture is first burned in the speed transition period as the reference crank angle. Further, the reference crank angle and judgment use crank angle can be set to the expansion bottom dead center or exhaust top dead center.

That is, in an embodiment according to the present invention, taking as an example the case where the air-fuel mixture is first burned in the for example #1 cylinder during the speed transition period, the compression top dead center of the #1 cylinder is set as the reference crank angle and the compression top dead center of the subsequent #3 cylinder is set as the first judgment use crank angle. Further, the compression top dead center of the subsequent #4 cylinder is set as the second judgment use crank angle, the compression top dead center of the subsequent #2 cylinder is set as the third judgment use crank angle, and the compression top dead center of the subsequent #1 cylinder is set as the fourth judgment use crank angle. Therefore, in this example, when the actual crank angle reaches the first judgment use crank angle, that is, the compression top dead center of the #3 cylinder, the first actual crank angle advancing time PA(1) is detected and the ignition timing SA is calculated. Next, when the actual crank angle reaches the second judgment use crank angle, that is, the compression top dead center of the #4 cylinder, the second actual crank angle advancing time PA(2) is detected and the ignition timing SA is calculated. In this way, the i-th actual crank angle advancing time PA(i) is successively detected, and the ignition timing SA is successively calculated.

Note that in an embodiment according to the present invention, after the ignition timing SA is calculated, that ignition timing SA is used in the cylinder after the cylinder where the ignition action is next performed. That is, for example, when the actual crank angle reaches the compression top dead center of the #1 cylinder, the actual crank angle advancing time is detected, and the ignition timing SA is calculated, the ignition timing SA calculated at this time is used in the ignition action of the #4 cylinder. Next, when the actual crank angle reaches the compression top dead center of the #3 cylinder, the actual crank angle advancing time is detected, and the ignition timing SA is calculated, the ignition timing SA calculated at this time is used in the ignition action of the #2 cylinder.

As explained above, in an embodiment according to the present invention, if the first actual crank angle advancing time PA(1) is detected, the difference DP(1) is calculated and the ignition timing SA is corrected based on this difference DP(1). That is, if the actual crank angle advancing time PA(i) is detected once, the correction of the ignition timing SA is started. Therefore, after engine startup begins, it is possible to quickly start ignition timing correction. Note that it is also possible to start correction of the ignition timing SA when the actual crank angle advancing time PA(i) is detected a predetermined number of times.

Such detection of the actual crank angle advancing time PA(i), calculation of the difference DP(i), and accordingly, correction of the ignition timing SA are performed until the number of times of detection i reaches a predetermined set number of times iM. So long as the actual crank angle advancing time PA(i) is being detected etc. in the speed transition period, the set number of times iM can to set in any way. Here, if considering the actual crank angle advancing time PA(i) is detected etc. once in one engine cycle, the number of times of detection i also expresses the number of times of ignition actions performed in the speed transition period when the air-fuel mixture is first burned.

Figure 6:
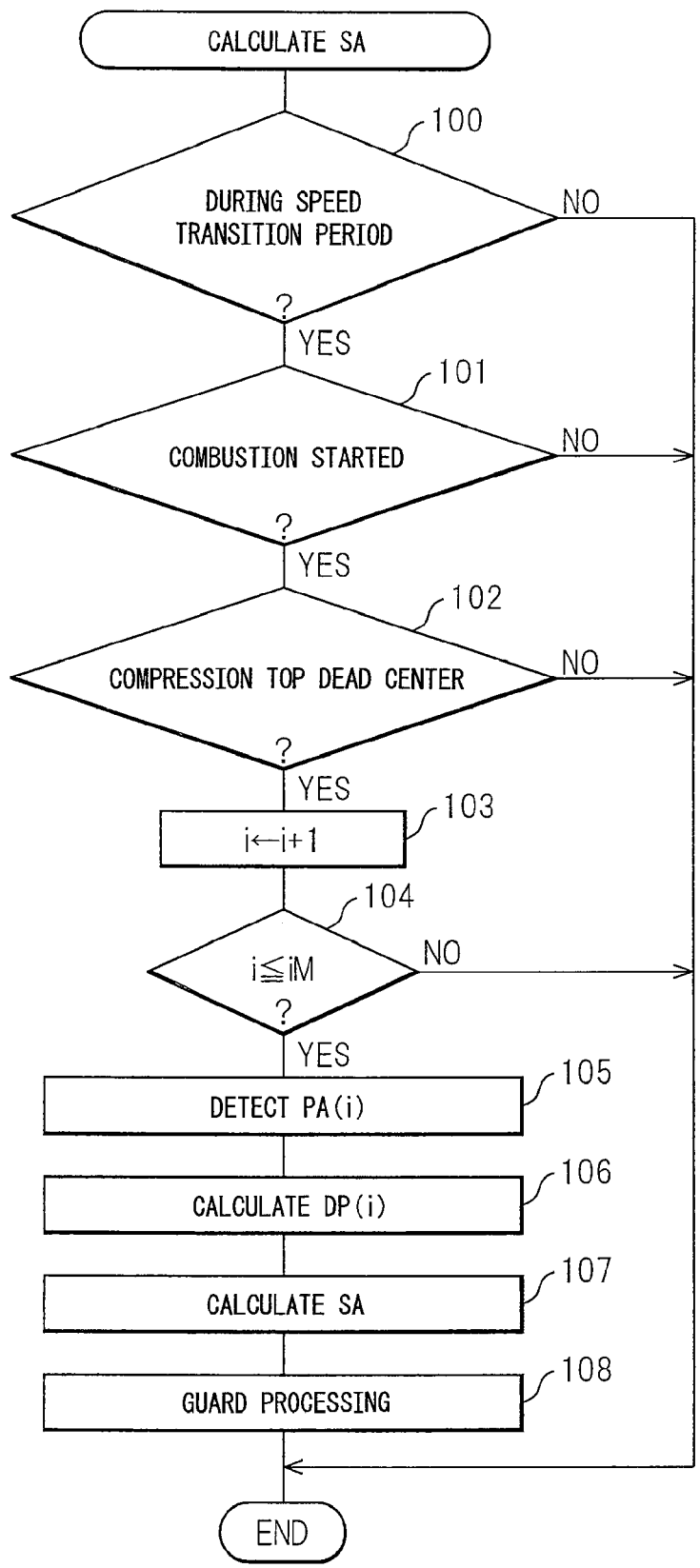
FIG. 6 is a flow chart showing an ignition timing calculation routine of an embodiment according to the present invention.

FIG. 6 shows an ignition timing calculation routine of the above-mentioned embodiment according to the present invention. This routine is executed every predetermined crank angle.

In the routine of FIG. 6, first, at step 100, it is judged if the engine is in a speed transition period. When it is judged that it is not in a speed transition period, the processing cycle is ended, while when it is judged that it is in a speed transition period, next the routine proceeds to step 101 where it is judged if combustion is being started. When it is judged that combustion is not being started, the processing cycle is ended, while when it is judged that combustion is being started, next the routine proceeds to step 102 where it is judged if the crank angle is compression top dead center for any cylinder. When it is judged that the crank angle is not the compression top dead center for any cylinder, the processing cycle is ended. On the other hand, when it is judged that the crank angle is compression top dead center for any cylinder, next the routine proceeds to step 103 where the number of times of detection i of the actual crank angle advancing time PA(i) is incremented by "1" (i=i+1). Note that the number of times of detection i is reset to zero at the time of start of engine operation. Next, at step 104, it is judged if the number of times of detection i is the set number of times iM or less (i≦iM). When it is judged that i>1M, the processing cycle is ended. On the other hand, when it is judged that i≦iM, the routine proceeds to step 105 where the i-th actual crank angle advancing time PA(i) is detected. Next, at step 106, the difference DP(i) is calculated (DP(i)=PR(i)−PA(i)). Next, at step 107, the ignition timing SA is calculated (SA=SAB+K·DP(i)). Next, at step 108, guard processing is performed.

Figure 7:
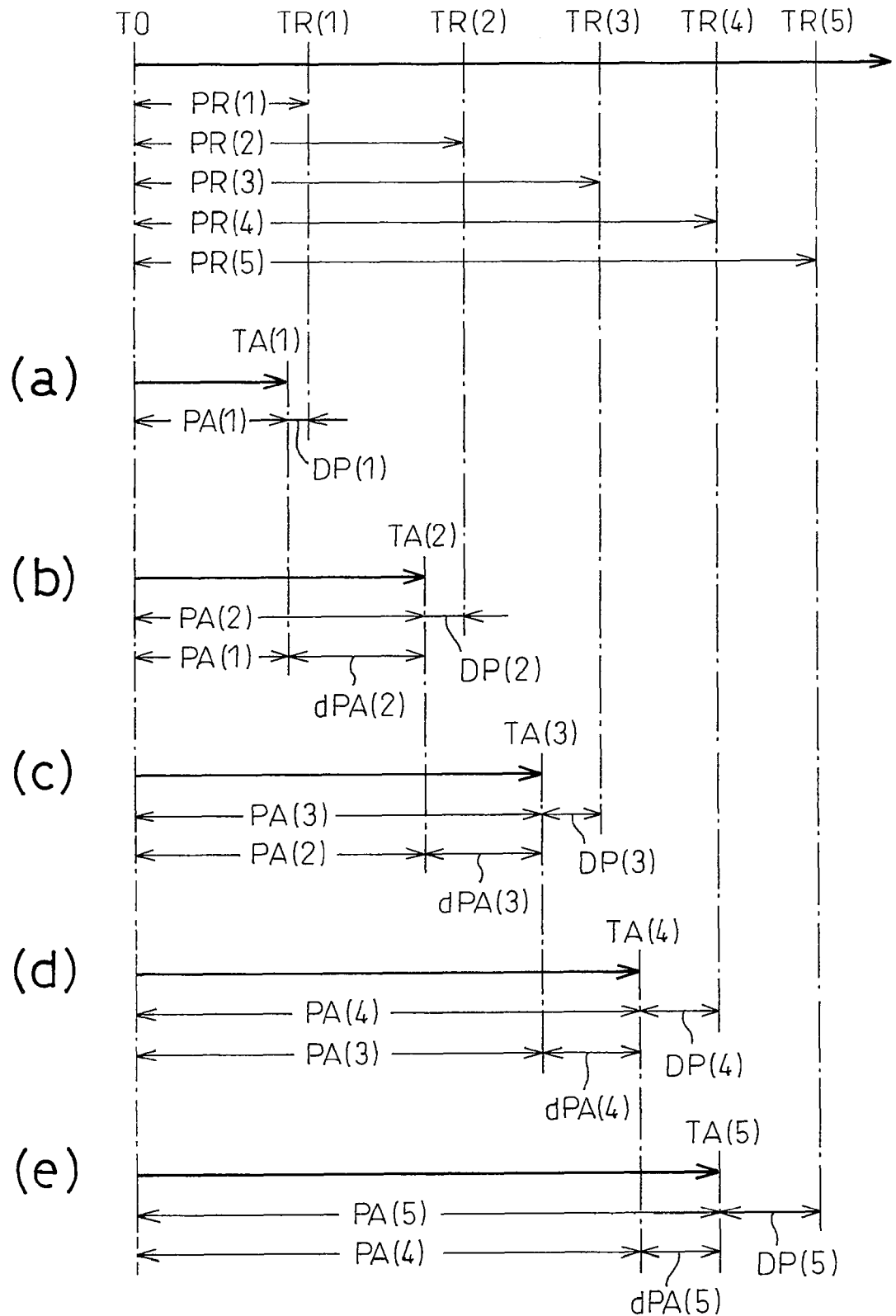
FIG. 7 is another time chart for explaining control of the ignition timing of an embodiment according to the present invention.

Note that if referring to the time required for advance from the (i−1)th judgment use crank angle to the i-th judgment use crank angle as the "i-th crank angle advancing time part dPA(i)", starting from the second crank angle advancing time PA(2), as shown in FIG. 7, it is also possible to detect the i-th crank angle advancing time part dPA(i) and add to the (i−1)th actual crank angle advancing time PA(i−1) the i-th crank angle advancing time part dPA(i) so as to detect (i) th actual crank angle advancing time PA(i) (PA(i)=PA(i−1)+dPA(i), i=2, 3, . . . ).

In this regard, in the above-mentioned embodiment according to the present invention, the time required for the crank angle to advance from the reference crank angle to each judgment use crank angle, that is, the crank angle advancing time, is used as a parameter for judging the fuel property. Next, two modifications of the fuel property judgment parameter will be explained.

That is, if the fuel is heavy, the amount of rise of the engine speed NE occurring when the crank angle advances from the reference crank angle to each judgment use crank angle, that is, a speed rise, becomes small, while if the fuel is light, the speed rise becomes large. Therefore, in a first modification, the speed rise is used as the fuel property parameter.

Explained specifically, in this first modification, the speed rise when the reference fuel is used, that is, the reference speed rise dNER(i), is detected in advance and stored in the ROM 34 in advance (i=1, 2, . . . ). When the actual crank angle reaches the i-th judgment use crank angle, the i-th actual speed rise dNEA(i) is detected and the difference DN(i) of the i-th actual speed rise dNEA(i) from the i-th reference speed rise dNER(i) is calculated (DN(i)=dNEA(i)−dNER(i)). Next, the ignition timing SA is calculated from the following formula:

$$SA=SAB+K\cdot DN(i)\ (i=1, 2, \ldots )$$

Figure 8:
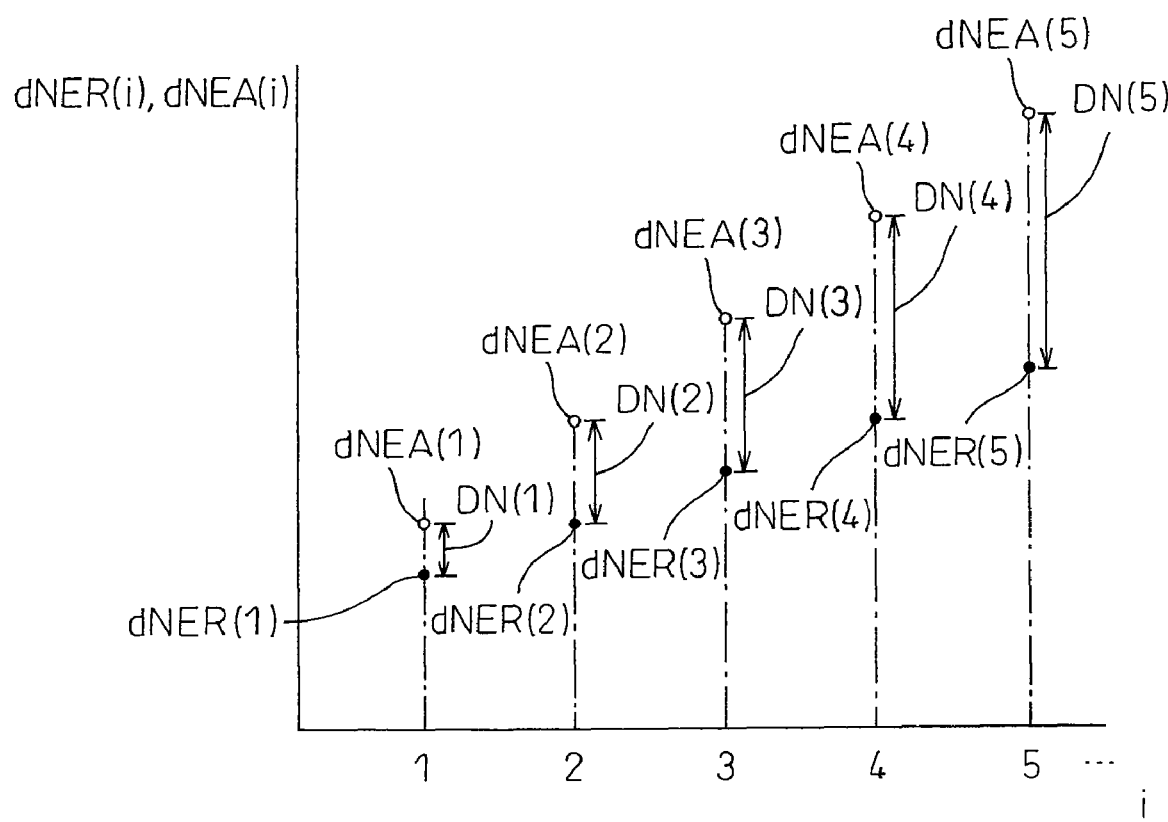
FIG. 8 is a graph for explaining a first modification according to the present invention.

In this case, as shown in FIG. 8, when the actual crank angle reaches the first judgment use crank angle, the first actual speed rise dNEA(1) is detected and the difference DN(1) of the first actual speed rise dNEA(1) from the first reference speed rise dNER(1) is calculated (DN(1)=dNEA(1)−dNER(1)). Next, the ignition timing SA is calculated from the above formula. Next, when the actual crank angle reaches the second judgment use crank angle, in the same way, the second actual speed rise dNEA(2) is detected, the difference DN(2) is calculated, and the difference DN(2) is used to calculate the ignition timing SA. Next, when the actual crank angle respectively reaches the third, fourth, and fifth judgment use crank angles, the actual speed rise dNEA(3), dNEA(4), and dNEA(5) are detected, the differences DN(3), DN(4), and DN(5) are calculated, and the ignition timing SA is calculated.

Figure 9:
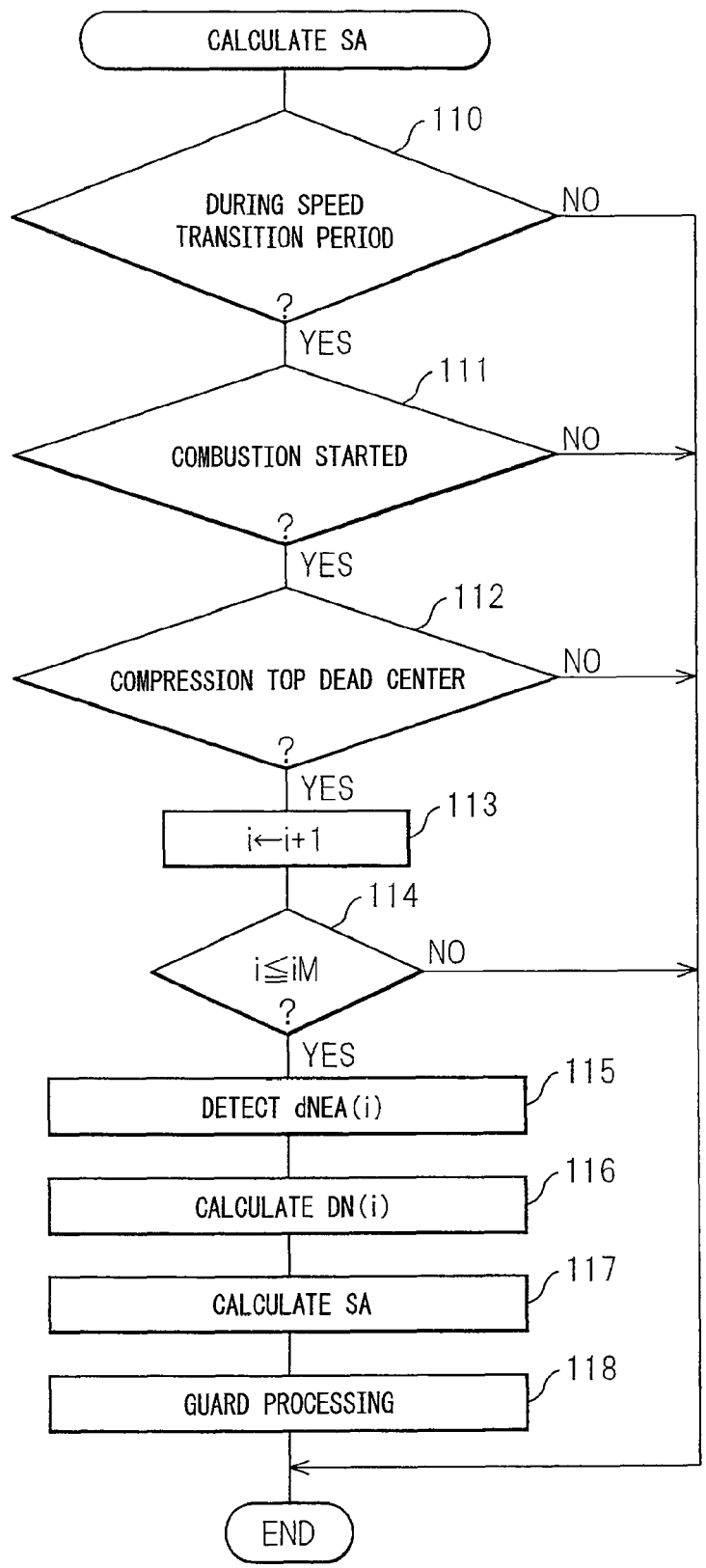
FIG. 9 is a flow chart showing an ignition timing calculation routine according to a first modification of the present invention.

FIG. 9 shows an ignition timing calculation routine according to a first modification of the present invention mentioned above. This routine is executed every predetermined crank angle.

In the routine of FIG. 9, first, at step 110, it is judged if the engine is in a speed transition period. When it is judged that it is not in a speed transition period, the processing cycle is ended, while when it is judged it is a speed transition period, next the routine proceeds to step 111 where it is judged if combustion is being started. When it is judged that combustion is not being started, the processing cycle is ended, while when it is judged that combustion is being started, next the routine proceeds to step 112 where it is judged if the crank angle is compression top dead center for any cylinder. When it is judged that the crank angle is not compression top dead center for any cylinder, the processing cycle is ended. On the other hand, when it is judged that the crank angle is compression top dead center for any cylinder, next the routine proceeds to step 113 where the number of times of detection $i$ of the actual speed rise dNEA(i) is incremented by "1" (i=i+1). Next at step 114, it is judged if the number of times of detection $i$ is the set number of times iM or less (i≦iM). When it is judged that i>iM, the processing cycle is ended. On the other hand, when it is judged that i≦iM, the routine proceeds to step 115 where the i-th actual speed rise dNEA(i) is detected. Next, at step 116, the difference DN(i) is calculated. Next, at step 117, the ignition timing SA is calculated. Next, at step 118, guard processing is performed.

On the other hand, if the fuel is heavy, the value of the angular acceleration of the crankshaft at the reference crank angle to which the angular acceleration of the crankshaft at the judgment use crank angle is successively added, that is, the angular acceleration cumulative value, becomes smaller, while if the fuel is light, the angular acceleration cumulative value becomes larger. Therefore, in the second modification, this angular acceleration cumulative value is used as a fuel property parameter.

Explained specifically, in this second modification, the angular acceleration cumulative value when the reference fuel is used, that is, the reference angular acceleration cumulative value SwR(i), is detected in advance and stored in the ROM 34 in advance (i=1, 2, ...). When the actual crank angle reaches the reference crank angle, the angular acceleration of the crankshaft dwt(0) at this time is detected. Next, when the actual crank angle reaches the i-th judgment use crank angle, the angular acceleration of the crankshaft dwt(i) at this time is detected, When the i-th actual angular acceleration cumulative value SwA(i)(=dwt(0)+Σdwt(i)) is detected, the difference DSw(i) of the i-th actual angular acceleration cumulative value SwA(i) from the i-th reference angular acceleration cumulative value SwR(i) is calculated (DSw(i)=SwA(i)−SwR(i)). Next, the ignition timing SA is calculated from the following formula:

$$SA = SAB + K \cdot DSw(i) \; (i=1, 2, \ldots)$$

Figure 10:
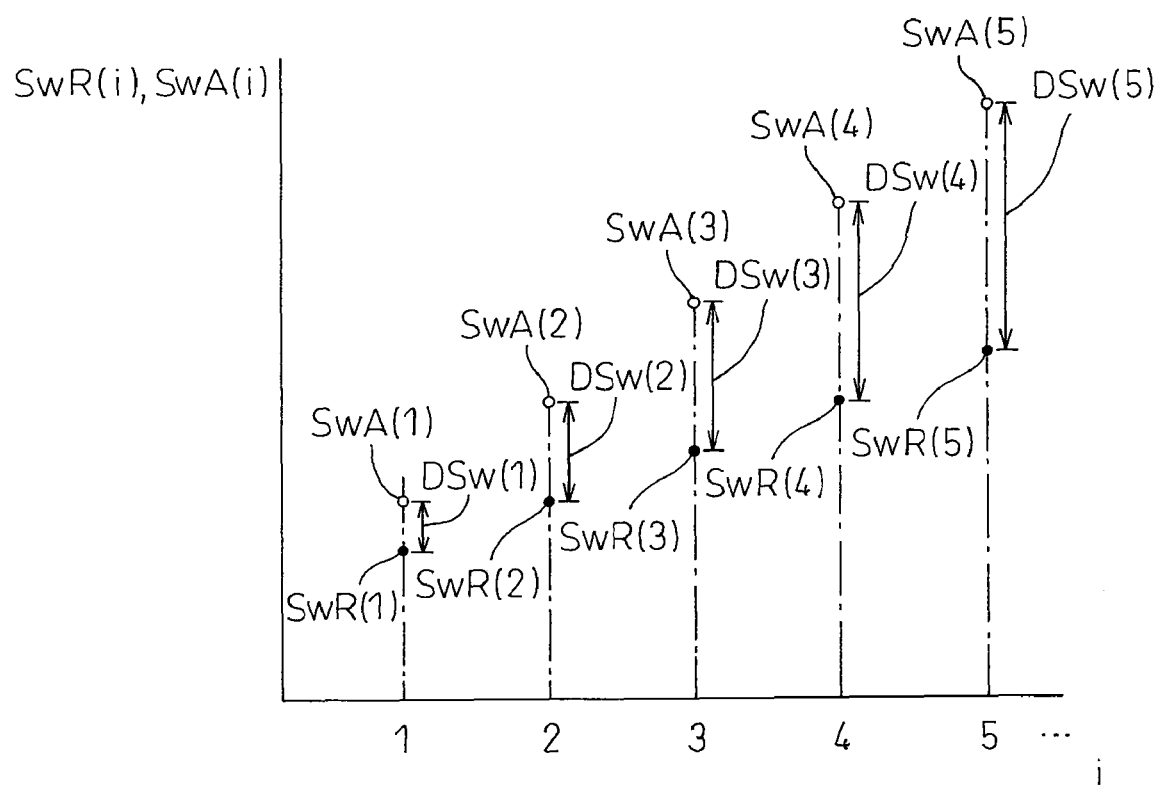
FIG. 10 is a graph for explaining a second modification according to the present invention.

In this case, as shown in FIG. 10, when the actual crank angle reaches the first judgment use crank angle, first actual angular acceleration cumulative value SwA(1) is detected, and the difference DSw(1) of the first actual angular acceleration cumulative value SwA(1) from the first reference angular acceleration cumulative value SwR(1) is calculated (DSw(1)=SwA(1)−SwR(1)). Next, the ignition timing SA is calculated from the above formula. Next, when the actual crank angle reaches the second judgment use crank angle, similarly, the second actual angular acceleration cumulative value SwA(2) is detected, the difference DN(2) is calculated, and the difference DN(2) is used to calculate the ignition timing SA. Next, when the actual crank angle respectively reaches the third, fourth, and fifth judgment use crank angles, the actual angular acceleration cumulative values SwA(3), SwA(4), and SwA(5) are respectively detected, the differences DSw(3), DSw(4), and DSw(5) are calculated, and the ignition timing SA is calculated.

Figure 11:
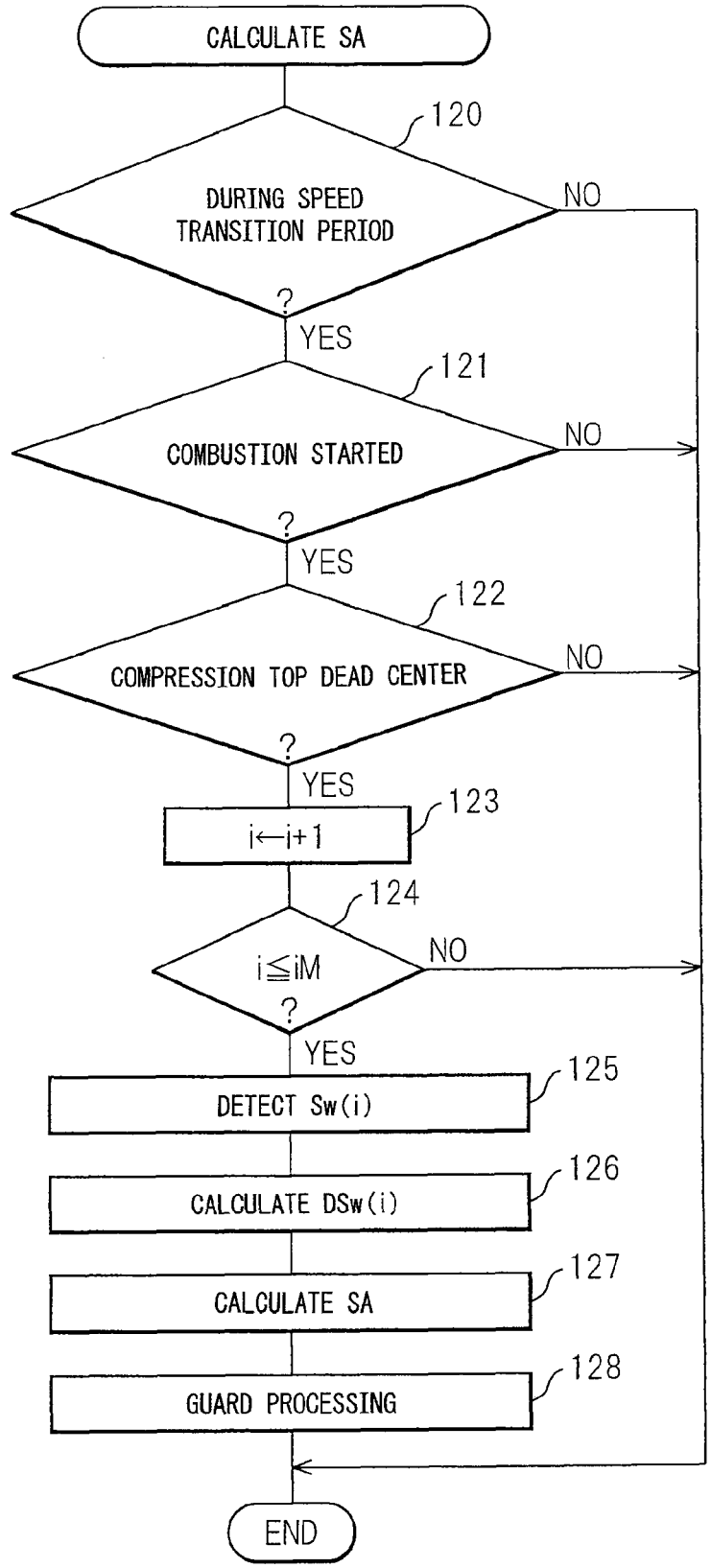
FIG. 11 is a flow chart showing an ignition timing calculation routine according to a second modification of the present invention.

FIG. 11 shows an ignition timing calculation routine of a second modification according to the present invention explained above. This routine is executed every predetermined crank angle.

In the routine of FIG. 11, first, at step 120, it is judged if the engine is in a speed transition period. When it is judged it is not in a speed transition period, the processing cycle is ended, while when it is judged it is in a speed transition period, next the routine proceeds to step 121 where it is judged if combustion is being started. When it is judged that combustion is not being started, the processing cycle is ended, while when it is judged that combustion is being started, next the routine proceeds to step 122 where it is judged if the crank angle is compression top dead center for any cylinder. When it is judged that the crank angle is not compression top dead center for any cylinder, the processing cycle is ended. On the other hand, when it is judged that the crank angle is compression top dead center for any cylinder, next the routine proceeds to step 123 where the number of times of detection $i$ of the actual angular acceleration cumulative value Sw(i) is incremented by "1" (i=i+1). Next, at step 124, it is judged if the number of times of detection $i$ is a set number of times iM or less (i≦iM). When it is judged that i>iM, the processing cycle is ended. On the other hand, when it is judged that i≦iM, the routine proceeds to step 125 where the i-th actual angular acceleration cumulative value Sw(i) is detected. Next, at step 126, the difference DSw(i) is calculated. Next, at step 127, the ignition timing SA is calculated. Next, at step 128, the guard processing is performed.

In the above-mentioned embodiment according to the present invention and its modification, the reference fuel is made from the heaviest fuel in the fuels envisioned as being used in the internal combustion engine. Alternatively, for example, it is also possible to make the reference fuel from intermediate fuel between the heaviest fuel and the lightest fuel in the fuels envisioned to be used in the internal combustion engine. In this case, for example, when the actual crank angle advancing time is shorter than the reference crank angle advancing time, the ignition timing SA is retarded from the basic ignition timing SAB in accordance with the difference of the actual crank angle advancing time from the reference crank angle advancing time, while when the actual crank angle advancing time is longer than the reference crank angle advancing time, the ignition timing SA is advanced from the basic ignition timing SAB in accordance with the difference of the actual crank angle advancing time from the reference crank angle advancing time.

Further, in the above-mentioned embodiment according to the present invention and its modification, the ignition timing at the most advanced side where knocking will not occur when reference fuel made from the heaviest fuel among the fuels envisioned as being used in the internal combustion engine is used is set for the basic ignition timing. By doing this, when the actually used fuel is the reference fuel, the amount of fuel necessary for making the output torque match the required torque can be minimized. Alternatively, it is also possible to set an ignition timing at a slightly more retarded side than the ignition timing at the most retarded side where knocking will not occur when the reference fuel is used for the basic ignition timing. By doing this, when the fuel used is heavier than the reference fuel, it becomes possible to retard the ignition timing and make the output torque match the required torque without causing knocking. However, the amount of fuel necessary for making the output torque match the required torque becomes somewhat greater than in the embodiment according to the present invention.

Further, in the above-mentioned embodiment according to the present invention and its modification, the retarding correction coefficient K was made a fixed value. Alternatively, the retarding correction coefficient K may also be changed based on various conditions. For example, when the in-cylinder temperature is high, the air-fuel mixture easily burns, so even with the same ignition timing, the output torque becomes larger. That is, when the in-cylinder temperature is high, to make the output torque match the required torque, the ignition timing has to be retarded more. Therefore, it is possible to set the retarding correction coefficient K so as to become greater the higher the in-cylinder temperature.

Further, in the above-mentioned embodiment according to the present invention and its modification, only the ignition timing is controlled in accordance with the difference. Alternatively, it is also possible to control only the fuel injection amount in accordance with the difference and possible to control both the ignition timing and fuel injection amount. When controlling only the fuel injection amount, for example when the i-th actual crank angle advancing time is shorter than the i-th reference crank angle advancing time, the fuel injection amount is corrected to reduce it in accordance with the difference DP(i), while when the i-th actual crank angle advancing time is longer than the i-th reference crank angle advancing time, the fuel injection amount is corrected to increase it according to the difference DP(i). Further, when controlling both the ignition timing and the fuel injection amount, for example when the i-th actual crank angle advancing time is shorter than the i-th reference crank angle advancing time, the ignition timing is corrected to retard it and the fuel injection amount is corrected to reduce it in accordance with the difference DP(i), while when the i-th actual crank angle advancing time is longer than the i-th reference crank angle advancing time, the ignition timing is corrected to advance it and the fuel injection amount is corrected to increase it in accordance with the difference DP(i).

In this embodiment according to the present invention, further the intake air amount is controlled during the speed transition period. Next, this control of the intake air amount will be explained.

As explained above, in an embodiment according to the present invention, the ignition timing SA is controlled so as to control the output torque so that during the speed transition period, the path followed by the engine speed NE matches a predetermined path. However, in practice, for example, there are cases where the speed peak value is lower than the speed peak value of the path set in advance and cases where when descending after passing the speed peak value, the descending speed becomes larger than the descending speed of the path set in advance. That is, the actual engine speed NE will not necessarily match the predetermined path. It is considered that this is due to the effects of frictional torque and because it is not possible to accurately grasp the frictional torque.

Therefore, in an embodiment according to the present invention, the frictional torque is predicted during the speed transition period and the throttle opening degree is controlled based on the predicted frictional torque so as to control the intake air amount and thereby control the output torque.

That is, in an embodiment according to the present invention, the throttle opening degree TOP during the speed transition period is calculated based on the following formula:

$$TOP = TOPB \cdot KK$$

Here, TOPB indicates the basic throttle opening degree, while KK indicates an opening degree correction coefficient. Note that when correction is not performed, the opening degree correction coefficient KK is set to 1.0.

Figure 12:
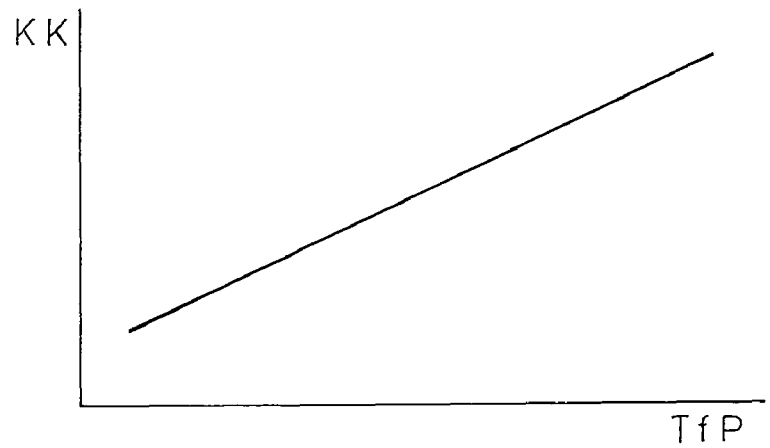
FIG. 12 is a view showing a map of an opening degree correction coefficient.

The opening degree correction coefficient KK, as shown in FIG. 12, is made larger than the frictional torque prediction value TfP. That is, the larger the frictional torque prediction value TfP, the more the intake air amount is corrected to increase it and therefore the more the output torque is corrected to increase it. This opening degree correction coefficient KK is stored as a function of the frictional torque prediction value TfP in the form of a map shown in FIG. 12 in advance in the ROM 34.

The frictional torque prediction value TfP is calculated based on for example the following formula in an embodiment according to the present invention:

$$TfP = TfS + (a \cdot dTfP1 + b \cdot dTfP2)/(a+b)$$

Here, TfS indicates the frictional torque of a standard internal combustion engine, dTfP1 a first frictional torque component prediction value, dTfP2 a second frictional torque component prediction value, and a and b weighting coefficients. That is, the frictional torque prediction value TfP is calculated by adding to the frictional torque TfS of a standard internal combustion engine the weighted average of the first frictional torque component prediction value dTfP1 and the second frictional torque prediction value dTfP2.

The frictional torque TfS of a standard internal combustion engine is for example found by experiments in advance.

The first frictional torque component prediction value dTfP1 and the second frictional torque component prediction value dTfP2 are for example calculated as follows. That is, first, explained roughly, a fuel property indicator expressing the property of the actually used fuel is calculated based on the retarding correction amount dSA of the ignition timing SA. Next, the speed peak value is predicted based on this fuel property indicator, the actual speed peak value is detected, the difference of the actual speed peak value from this predicted speed peak value is calculated, and the first frictional torque component prediction value dTfP1 is calculated based on this difference. Further, the angular acceleration of the crankshaft during the speed transition period when the engine speed passes the speed peak value, then the engine speed descends is predicted based on the fuel property indicator, the angular acceleration of the crankshaft when the engine speed actually descends is detected, the difference of the actual angular acceleration from the predicted angular acceleration is calculated, and the second frictional torque component prediction value dTfP2 is calculated based on this difference.

Figure 13:
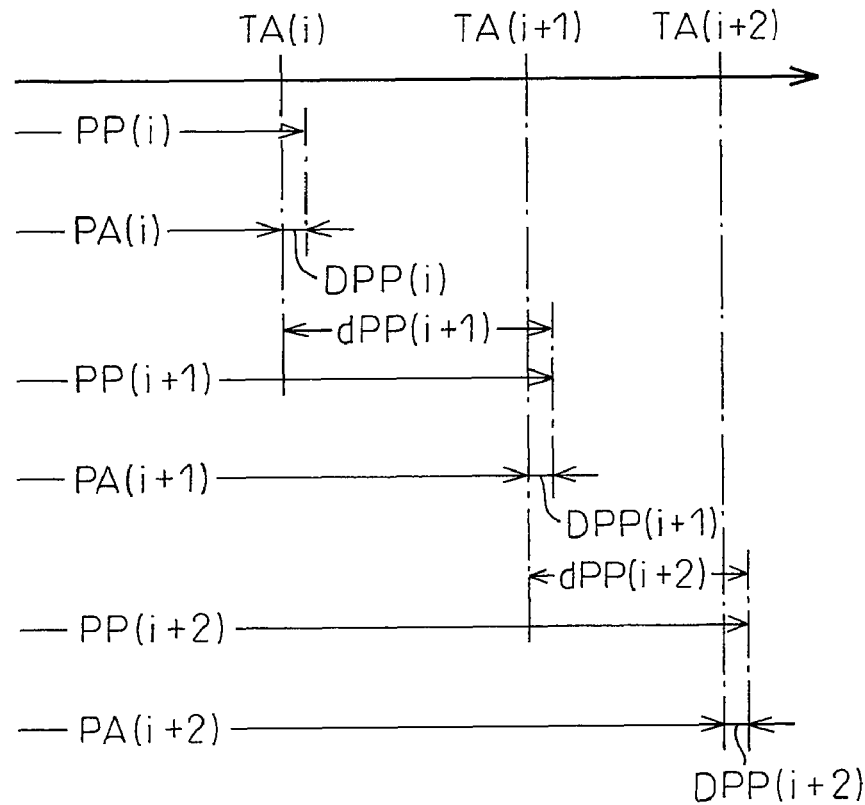
FIG. 13 is a time chart for explaining a method of calculation of the fuel property indicator.

Next, the method of calculation of the fuel property indicator will be explained in detail while referring to FIG. 13.

In an embodiment according to the present invention, as explained above, when the crank angle reaches the i-th judgment use crank angle, the i-th actual crank angle advancing time PA(i) is detected and the ignition timing SA is calculated. At this time, further, the (i+1)th crank angle advancing time prediction value PP(i+1) is calculated. Furthermore, the difference DPP(i) of the i-th actual crank angle advancing time PA(i) from the i-th actual crank angle advancing time prediction value PP(i) calculated when the crank angle reaches the (i−1)th judgment use crank angle is calculated (DPP(i)=PP(i)−PA(i)).

Next, when the crank angle reaches the (i+1)th judgment use crank angle, in the same way, the (i+1)th actual crank angle advancing time PA(i+1) is detected and the ignition timing SA is calculated. At this time, further, the (i+2)th crank angle advancing time prediction value PP(i+2) is calculated. Further, the difference DPP(i+1) of the (i+1)th actual crank angle advancing time PA(i+1) from the previously calculated (i+1)th actual crank angle advancing time prediction value PP(i+1) is calculated (DPP(i+1)=PP(i+1)−PA(i+1)).

Explained specifically, for example, when the crank angle reaches the second judgment use crank angle, the second actual crank angle advancing time PA(2) is detected and the ignition timing SA is calculated. At this time, further, the third crank angle advancing time prediction value PP(3) is calculated. Further, the difference DPP(2) of the second actual crank angle advancing time PA(2) from the previously calculated second actual crank angle advancing time prediction value PP(2) is calculated (DPP(2)=PP(2)−PA(2)). Note that when the crank angle reaches the first judgment use crank angle, the first crank angle advancing time prediction value PP(1) is not calculated, so the difference DPP(1) is not calculated. The difference DPP(i) is calculated after the crank angle reaches the second judgment use crank angle (i=2, 3, . . . ).

In this way, the difference DPP(i) is repeatedly calculated each time the crank angle reaches the i-th judgment use crank angle. In an embodiment according to the present invention, the difference DPP(i) is repeatedly calculated until the number of times of detection i reaches a previously determined set number of times iN.

Here, for example, the (i+1)th crank angle advancing time prediction value PP(i+1) is calculated in the following way. That is, first, the prediction value dPP(i+1) of the time for the crank angle to advance from the i-th judgment use crank angle to the (i+1)th judgment use crank angle, that is, the (i+1)th crank angle advancing time part, is calculated. Next, this prediction value dPP(i+1) is added to the i-th actual crank angle advancing time PA(i) to calculate the (i+1)th crank angle advancing time prediction value PP(i+1) (PP(i+1)=PA(i)+dPP(i+1)).

Figure 14:
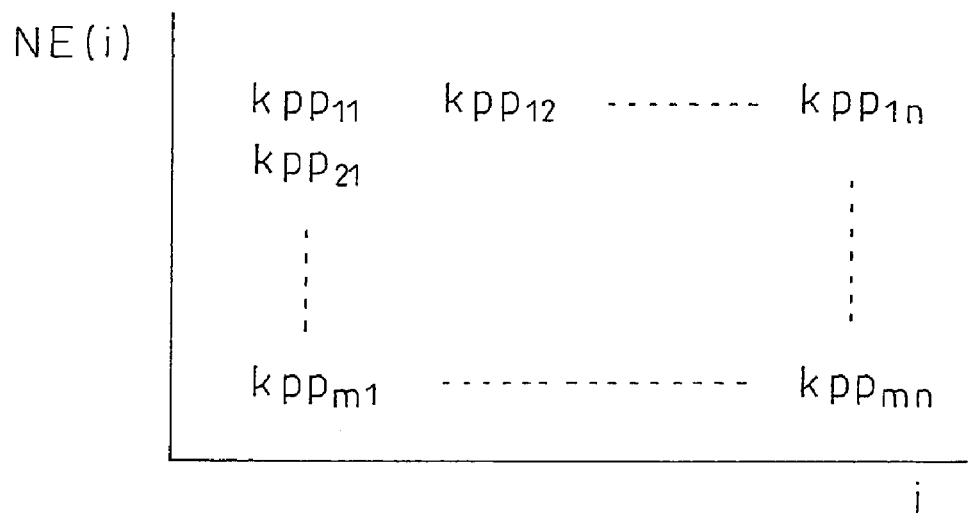
FIG. 14 is a view showing a map of the weighting coefficient.

In this case, the (i+1)th crank angle advancing time part prediction value dPP(i+1) is calculated by multiplying the weighting coefficient kpp with the retarding correction amount dSA(i)(=K·DP(i)) of the ignition timing SA calculated based on the i-th actual crank angle advancing time PA(i) whereby the (i+1)th crank angle advancing time part prediction value dPP(i+1) is calculated (dPP(i+1)=kpp·dSA(i)). Therefore, the larger the retarding correction amount dSA(i), that is, the lighter the actually used fuel, the larger the (i+1)th crank angle advancing time part prediction value dPP(i+1). Note that the weighting coefficient kpp is for example stored as a function of the number of times of detection i and the engine speed NE(i) when the crank angle actually reaches the i-th judgment use crank angle in the form of a map shown in FIG. 14 in advance in the ROM 34.

When the difference DPP(i) is calculated, the fuel property indicator fd is calculated based on the difference DPP(i) calculated up to there. Specifically, the fuel property indicator fd is calculated based on the following formula:

$$fd = \Sigma(DPP(i) \cdot kfd) \ (i=2, 3, \ldots)$$

Here, kfd is a weighting coefficient determined in accordance with the number of times of detection i.

That is, the retarding correction amount dSA(i) of the ignition timing SA, as explained above, expresses the property of the actually used fuel. Therefore, the (i+1)th crank angle advancing time prediction value PP(i+1) calculated based on the retarding correction amount dSA(i) is determined in accordance with the fuel property expressed by the retarding correction amount dSA(i). This being the case, the difference DPP(i+1)(=PP(i+1)−PA(i+1)) can be said to express the difference of the property of the actually used fuel from the fuel property expressed by the retarding correction amount dSA(i), and the difference DPP(i+1) can further be said to express the property of the actually used fuel. Therefore, in an embodiment according to the present invention, the difference DPP(i+1) is cumulatively added to calculate the fuel property indicator fd. In this case, the lighter the actually used fuel, the larger the difference DPP(i), so the actually used fuel can be said to be light when the fuel property indicator fd is large compared to when it is small.

In an embodiment according to the present invention, the fuel property indicator fd is repeatedly calculated each time the difference DPP(i) is calculated, that is, each time the crank angle reaches the i-th judgment use crank angle. Next, when the number of times of detection i reaches the set number of times iN, as explained above, the calculation of the difference DPP(i) is ended and the calculation of the fuel property indicator fd at this time is also ended. Therefore, the fuel property indicator fd calculated when the number of times of detection i reaches the set number of times iN becomes the final fuel property indicator fd. Note that the fuel property indicator fd need not be calculated each time the crank angle reaches the i-th judgment use crank angle. The fuel property indicator fd may also be calculated only once after the number of times of detection i reaches the set number iN.

Figure 15:
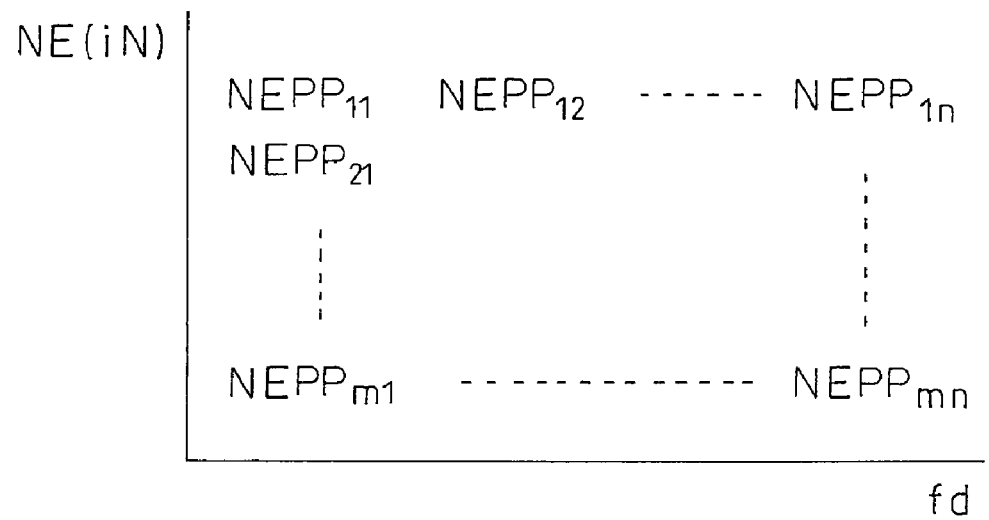
FIG. 15 is a view showing a map of the speed peak prediction value.

If the fuel property indicator fd is calculated in this way, first the frictional torque component prediction value dTfP1 is calculated. That is, first, the fuel property indicator fd is used to calculate the speed peak prediction value NEPP. In this case, the speed peak prediction value NEPP is calculated based on the fuel property indicator fd and the engine speed NE(iN) when the crank angle reaches the iNth judgment use crank angle. In this case, the speed peak prediction value NEPP, for example, becomes higher the larger the fuel property indicator fd and becomes higher the higher the engine speed NE(iN). The speed peak prediction value NEPP is stored as a function of the fuel property indicator fd and engine speed NE(iN) in the form of a map shown in FIG. 15 in advance in the ROM 34.

Note that the set number of times iN is the above-mentioned set number of times iM or less and is set in advance so that the engine speed NE does not reach the speed peak value NEP when the actual crank angle reaches the iNth judgment use crank angle.

Next, the actual speed peak value NEPA is detected. There are various methods for detecting the actual speed peak value NEPA. For example, it is possible to repeatedly detect the angular acceleration of the crankshaft dwt and, when the angular acceleration dwt consecutively becomes a negative value a predetermined number of times, make the engine speed NE when the angular acceleration dwt becomes substantially zero the actual speed peak value NEPA.

Next, the difference DNEP of the actual speed peak value NEPA from the speed peak prediction value NEPP is calculated (DNEP=NEPP−NEPA).

Figure 16:
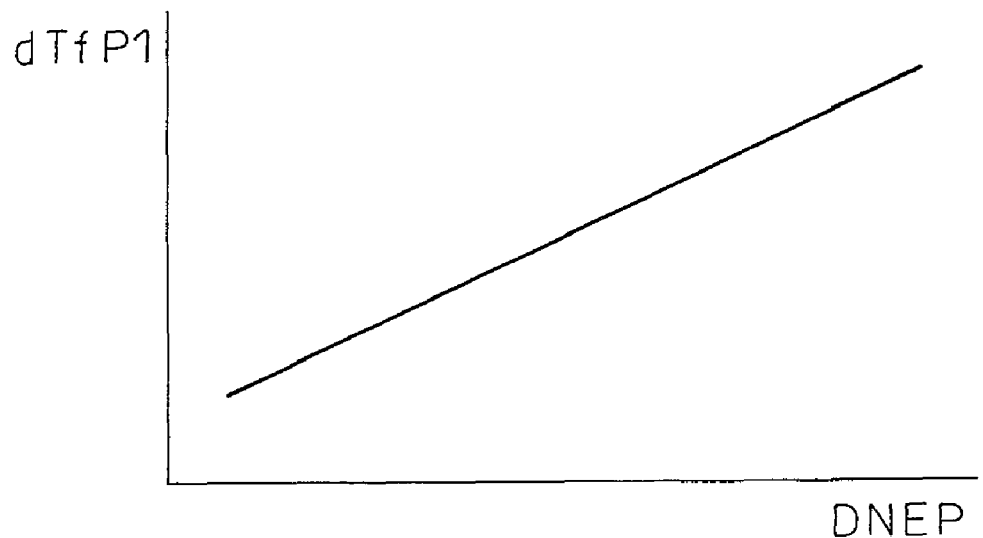
FIG. 16 is a view showing a map of a first frictional torque component prediction value.

Next, the first frictional torque component prediction value dTfP1 is calculated based on this difference DNEP. In this case, as the difference DNEP becomes larger, the first frictional torque component prediction value dTfP1 becomes larger. This first frictional torque component prediction value dTfP1 is stored as a function of the difference DNEP in the form of a map shown in FIG. 16 in advance in the ROM 34.

That is, the speed peak prediction value NEPP is calculated based on the fuel property indicator fd expressing the property of the actually used fuel, so the difference DNEP of the actual speed peak value NEPA from the speed peak prediction value NEPP is due to the frictional torque. Therefore, in an embodiment according to the present invention, the first frictional torque component prediction value dTfP1 is calculated based on the difference DNEP.

Further, when the fuel property indicator fd is calculated, the second frictional torque component prediction value dTfP2 is calculated. That is, first, a prediction value dwtP of an angular acceleration of the crankshaft at a predetermined set timing in the speed transition period is calculated. This angular acceleration prediction value dwtP is for example calculated based on the following formula using the inertia moment I:

$$dwtP = (TP - TfS)/I$$

Here, TP shows the prediction value of the torque at the set timing. This torque prediction value TP is for example calculated as a function of the fuel property indicator fd and the ignition timing SA, engine load ratio KL, and fuel injection amount Ftau at a set timing. Note that the engine load ratio KL means the ratio of the engine load to the full load.

In an embodiment according to the present invention, this set timing is in the period in the speed transition period when the engine speed NE descends after the engine speed NE passes the speed peak value NEP. Therefore, the above-mentioned angular acceleration prediction value dwtP is the prediction value of the angular acceleration when the engine speed NE descends after the engine speed NE passes the speed peak value NEP.

Next, when the set timing arrives, the actual angular acceleration dwtA of the crankshaft is detected. Next, the difference Ddwt of the actual angular acceleration dwtA from the angular acceleration prediction value dwtP is calculated (Ddwt=dwtp−dwtA).

Figure 17:
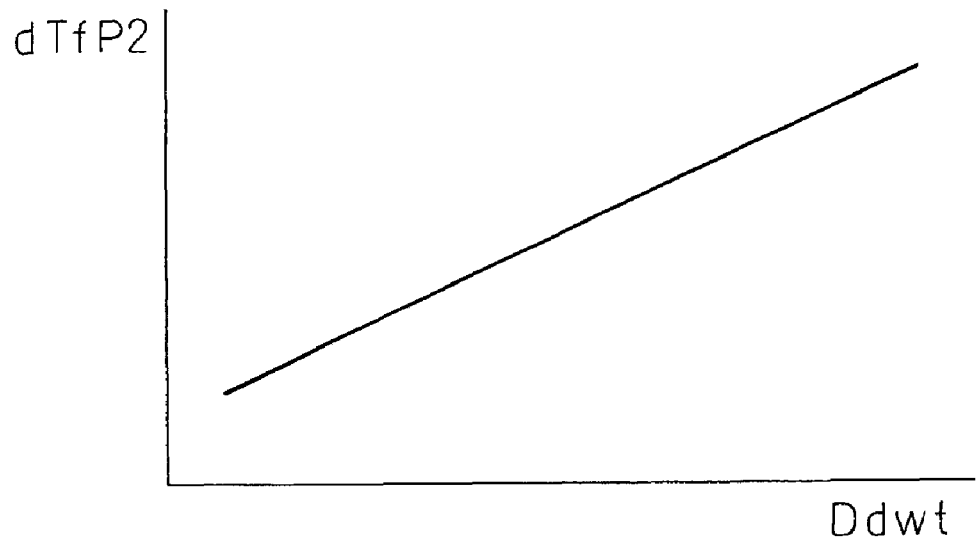
FIG. 17 is a view showing a map of a second frictional torque component prediction value.

Next, the second frictional torque component prediction value dTfP2 is calculated based on this difference Ddwt. In this case, as the difference Ddwt becomes larger, the second frictional torque component prediction value dTfP2 becomes larger. This is because the difference Ddwt of the actual angular acceleration dwtA from the angular acceleration prediction value dwtP is due to the frictional torque. This second frictional torque component prediction value dTfP2 is stored as a function of the difference Ddwt in the form of a map shown in FIG. 17 in advance in the ROM 34.

When the first frictional torque component prediction value dTfP1 and second frictional torque component prediction value dTfP2 are calculated in this way, the frictional torque prediction value TfP is calculated from the above-mentioned formula. Next, the opening degree correction coefficient KK is calculated, and the throttle opening degree TOP is calculated.

Figure 18:
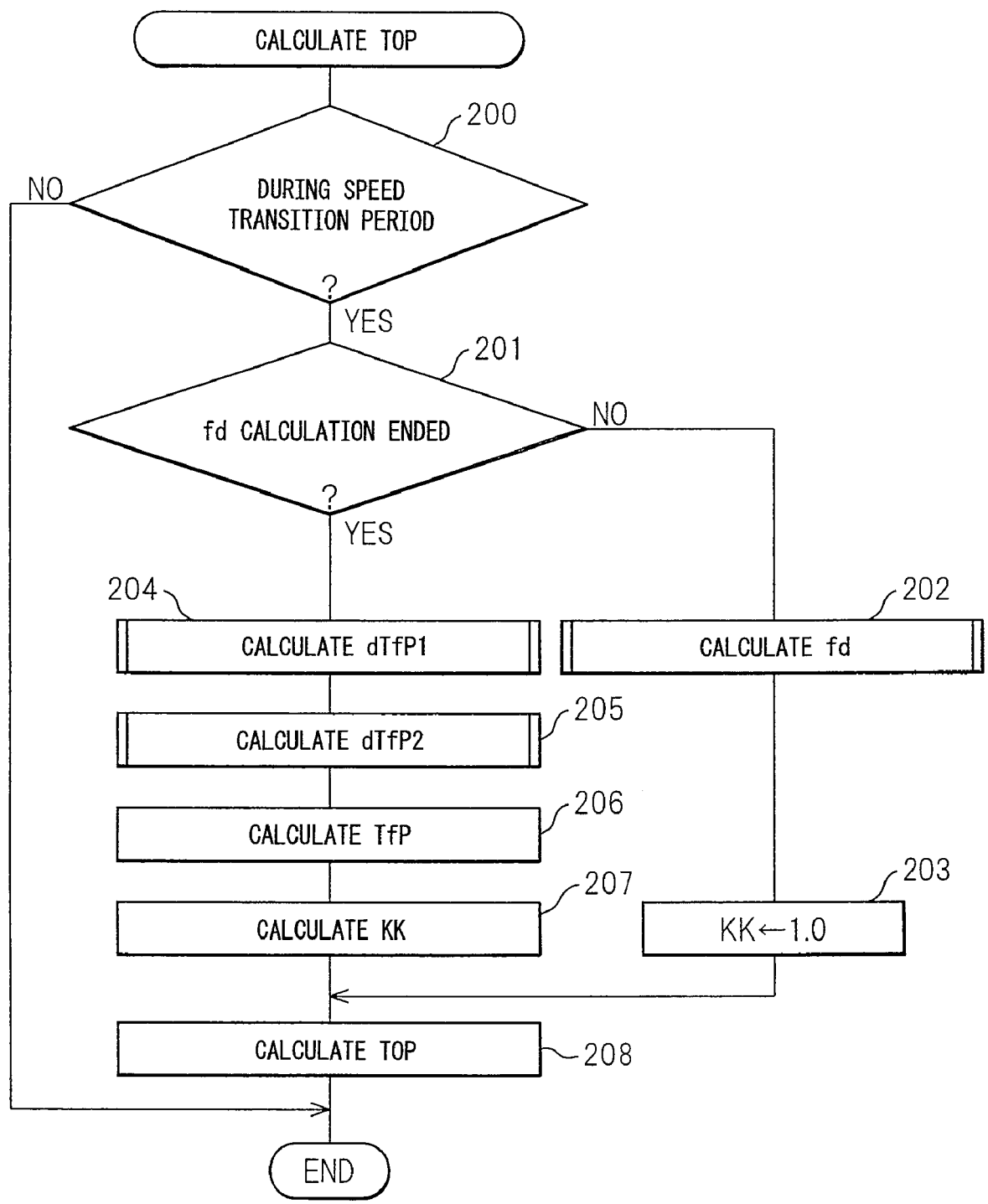
FIG. 18 is a flow chart showing a throttle opening degree calculation routine of an embodiment according to the present invention.

FIG. 18 shows a throttle opening degree calculation routine of an embodiment according to the present invention. This routine is executed by interruption every predetermined set time.

Figure 19:
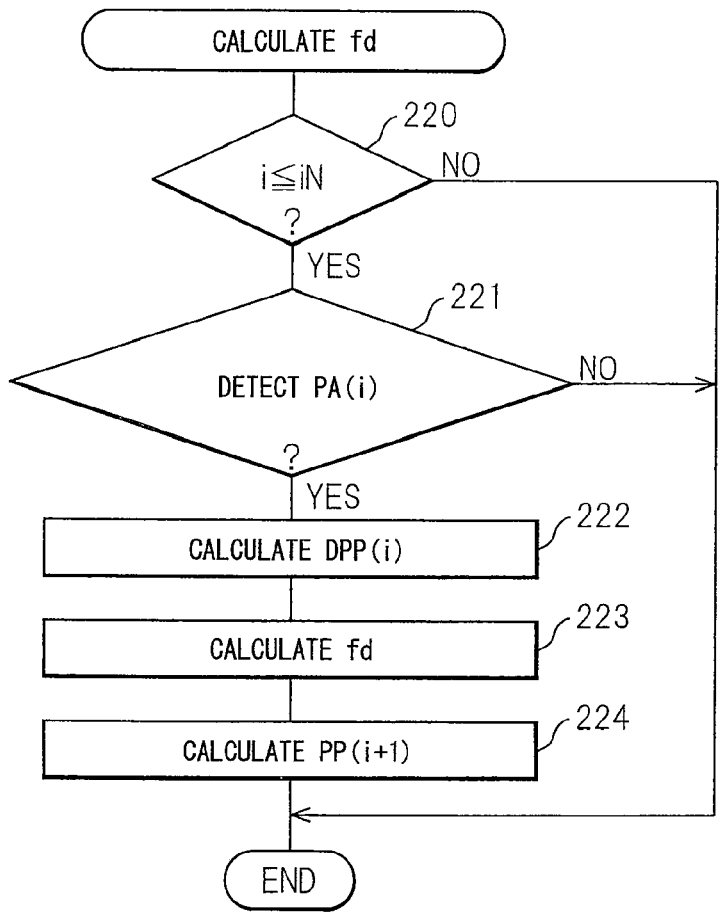
FIG. 19 is a flow chart showing a fuel property indicator calculation routine of an embodiment according to the present invention.

Referring to FIG. 18, at step 200, it is judged if the engine is in a speed transition period. When it is judged it is not in the speed transition period, the processing cycle is ended, while when it is judged that it is in the speed transition period, next the routine proceeds to step 201 where it is judged if the calculation of the fuel property indicator fd is ended. When it is judged that the calculation of the fuel property indicator fd is not ended, next the routine proceeds to step 202 where the calculation routine of the fuel property indicator fd is executed. This routine is shown in FIG. 19. Next, at step 203, the opening degree correction coefficient KK is made 1.0. Next, the routine proceeds to step 208.

Figure 20:
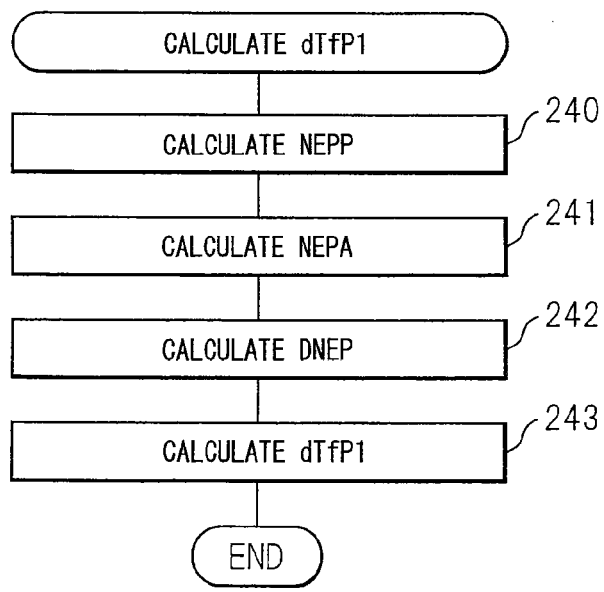
FIG. 20 is a flow chart showing a calculation routine of a first frictional torque component prediction value of an embodiment according to the present invention.
Figure 21:
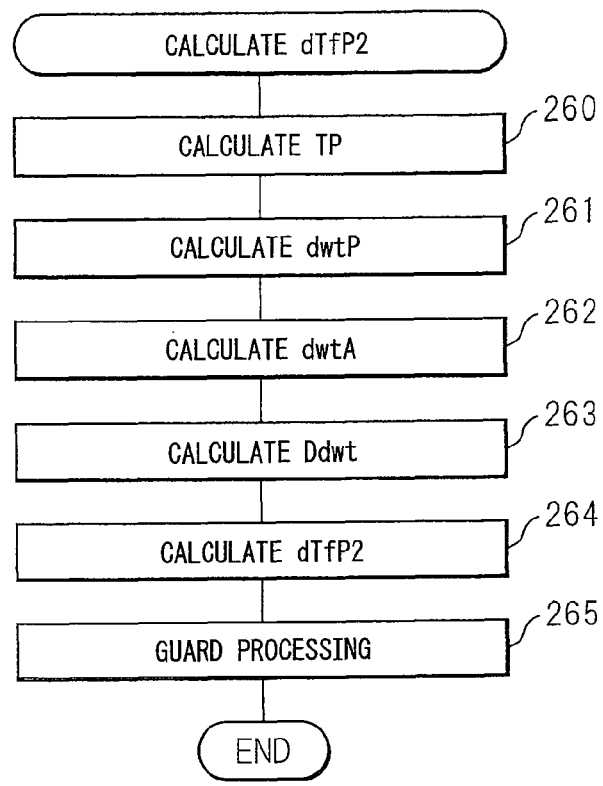
FIG. 21 is a flow chart showing a calculation routine of a second frictional torque component prediction value of an embodiment according to the present invention.

When it is judged that the calculation of the fuel property indicator fd has ended, the routine proceeds from step 201 to step 204 where the calculation routine for the first frictional torque component prediction value dTfP1 is executed. This routine is shown in FIG. 20. Next, at step 205, the calculation routine of the second frictional torque component prediction value dTfP2 is executed. This routine is shown in FIG. 21. Next, at step 206, the frictional torque prediction value TfP is calculated from the above formula. Next, at step 207, the opening degree correction coefficient KK is calculated from the map of FIG. 12. Next, the routine proceeds to step 208.

At step 208, the throttle opening degree TOP is calculated (TOP=TOPB·KK).

FIG. 19 shows the calculation routine of the fuel property indicator fd. Referring to FIG. 19, at step 220, it is judged if the number of times of detection i of the actual crank angle advancing time PA(i) is the set number of times iN or less. When i≦iN, next the routine proceeds to step 221 where it is judged if the actual crank angle advancing time PA(i) is calculated. If it is judged that the actual crank angle advancing time PA(i) is not calculated, the processing cycle is ended. When it is judged that the actual crank angle advancing time PA(i) is calculated, next the routine proceeds to step 222 where the difference DPP(i) is calculated (DPP(i)=PP(i)−PA(i)). Next, at step 223, the fuel property indicator fd is calculated (fd=Σ(DPP(i)·kfd)). Next, at step 224, the (i+1)th crank angle advancing time prediction value PP(i+1) is calculated.

Next, if i>iN, the processing cycle is ended from step 220. Therefore, the calculation of the fuel property indicator fd is ended.

FIG. 20 shows the calculation routine of the first frictional torque component prediction value dTfP1. Referring to FIG. 20, first, at step 240, the speed peak prediction value NEPP is calculated from the map of FIG. 15. Next, at step 241, the actual speed peak value NEPA is detected. Next, at step 242, the difference DNEP is calculated (DNEP=NEPP−NEPA). Next, at step 243, the first frictional torque component prediction value dTfP1 is calculated from the map of FIG. 16.

FIG. 21 shows a calculation routine of the second frictional torque component prediction value dTfP2. Referring to FIG. 21, first, at step 260, the torque prediction value TP at a set timing is calculated. Next, at step 261, the angular acceleration prediction value dwtP at the set timing is calculated (dwtP=(TP−TfS)/I). Next, at step 262, the actual angular acceleration dwtA at the set timing is detected. Next, at step 263, the difference Ddwt is calculated (Ddwt=dwtP−dwtA). Next, at step 264, the second frictional torque component prediction value dTfP2 is calculated from the map of FIG. 17. Next, at step 265, guard processing is performed. That is, when the calculated second frictional torque component prediction value dTfP2 is larger than an upper limit value, the second frictional torque component prediction value dTfP2 is returned to the upper limit value, while when the second frictional torque component prediction value dTfP2 is smaller than a lower limit value, the second frictional torque component prediction value dTfP2 is returned to the lower limit value. In this case, if the frictional torque TfS of a standard internal combustion engine to which the first frictional torque component prediction value dTfP1 is added is called the "first frictional torque prediction value TfP1" (TfP1=TfS+dTfP1), the upper limit value and lower limit value are determined based on the first frictional torque prediction value.

Next, a modification of the method of calculation of the second frictional torque component prediction value dTfP2 will be explained.

In this modification, a plurality of set timings are set in advance in the speed transition period and the angular acceleration prediction value dwtP of the crankshaft at each set timing is calculated. When each set timing arrives, the actual angular acceleration dwtA is detected, the difference Ddwt of the actual angular acceleration dwtA from the angular acceleration prediction value dwtP is calculated, and the second frictional torque component prediction value dTfP2 is calculated based on the difference Ddwt. Each time the second frictional torque component prediction value dTfP2 is calculated, its arithmetic average value AVE is calculated, and the frictional torque prediction value TfP is calculated from the following formula using this arithmetic average value AVE:

$$TfP=TfS+(a \cdot dTfP1+b \cdot AVE)/(a+b)$$

By doing this, it is possible to accurately calculate the second frictional torque component prediction value dTfP2, so it is possible to accurately calculate the frictional torque prediction value TfP and therefore possible to accurately control the throttle opening degree TOP.

Figure 22:
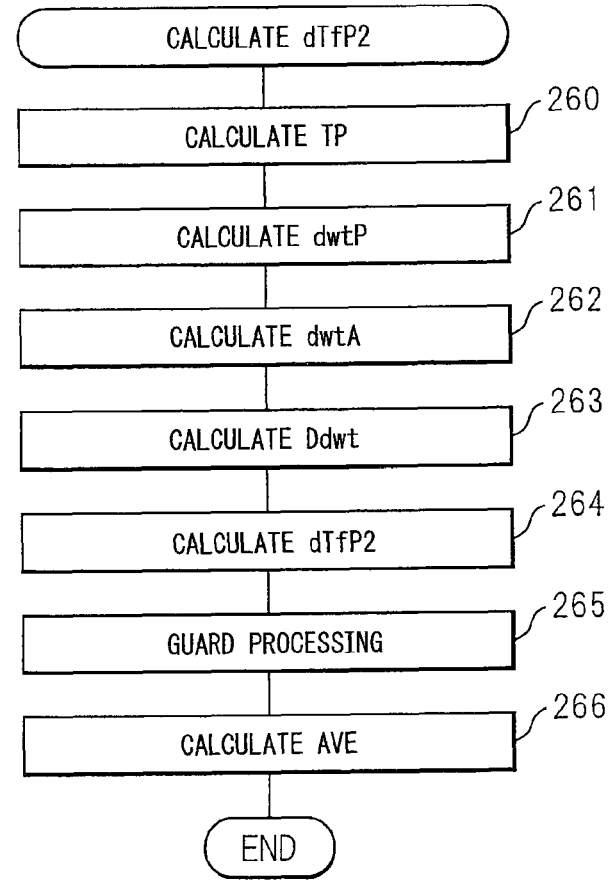
FIG. 22 is a flow chart showing a calculation routine of a second frictional torque component prediction value of a modification according to the present invention.

FIG. 22 shows a calculation routine of the second frictional torque component prediction value dTfP2 of a modification of the present invention. Referring to FIG. 22, first, at step 260, the torque prediction value TP at a set timing is calculated. Next, at step 261, the angular acceleration prediction value dwtP at a set timing is calculated. Next, at step 262, the actual angular acceleration dwtA at a set timing is detected. Next, at step 263, the difference Ddwt is calculated (Ddwt=dwtP−dwtA). Next, at step 264, the second frictional torque component prediction value dTfP2 is calculated from the map of FIG. 17. Next, at step 265, guard processing is performed. Next, at step 266, the average value AVE of the second frictional torque component prediction value dTfP2 is calculated. At step 206 of FIG. 18, the frictional torque prediction value TfP is calculated based on the average value AVE.

In the embodiments according to the present invention explained up to here, the crank angle advancing time prediction value was calculated based on the correction amount of the ignition timing calculated based on the crank angle advancing time and the fuel property indicator fd was calculated based on the crank angle advancing time prediction value. Alternatively, it is also possible to calculate the crank angle advancing time prediction value based on the correction amount of the fuel injection amount calculated based on the crank angle advancing time. Further, it is also possible to calculate the crank angle advancing time prediction value based on the correction amount of the ignition timing or fuel injection amount calculated based on the speed rise or angular acceleration cumulative value. That is, generalized, the crank angle advancing times are predicted based on the correction amounts of the ignition timing or fuel injection amount, the actual crank angle advancing times are detected, the differences of the actual crank angle advancing times from the predicted crank angle advancing times are calculated, the cumulative value of these differences is calculated, and the fuel property indicator is calculated based on this cumulative value.

Alternatively, it is also possible to calculate the speed rise prediction value based on the correction amount of the ignition timing or fuel injection amount calculated based on the crank angle advancing time, speed rise, or angular acceleration cumulative value and calculate the fuel property indicator fd based on the speed rise prediction values. That is, generalized, the speed rises are calculated based on the correction amounts of the ignition timing or fuel injection amount, the actual speed rises are detected, the differences of actual speed rises from the predicted speed rises are calculated, the cumulative value of these differences is calculated, and the fuel property indicator is calculated based on this cumulative value.

Alternatively, it is also possible to calculate the angular acceleration cumulative value based on the correction amount of the ignition timing or fuel injection amount calculated based on the crank angle advancing time, speed rise, or angular acceleration cumulative value and calculate the fuel property indicator fd based on the angular acceleration cumulative value. That is, generalized, the angular acceleration cumulative values are predicted based on the correction amounts of the ignition timing or fuel injection amount, the actual angular acceleration cumulative values are detected, the differences of the actual angular acceleration cumulative values from the predicted angular acceleration cumulative values are calculated, the cumulative value of these differences is calculated, and the fuel property indicator is calculated based on this cumulative value.

Further, in the above-mentioned embodiment according to the present invention and its modification, the explanation was given of the case of application of the present invention to a four-cylinder internal combustion engine provided with fuel injectors to inject fuel into the intake ports. Alternatively, the present invention can also be applied to an internal combustion engine having other than four cylinders or an internal combustion engine provided with fuel injectors for directly injecting fuel into the cylinders.

LIST OF REFERENCE NUMERALS

1 . . . Engine body
5 . . . Combustion chamber
10 . . . Spark plug
11 . . . Fuel injector
18 . . . Throttle valve
42 . . . Crank angle sensor

The invention claimed is:

1. A startup control device for an internal combustion engine, comprising:
 a setting means for setting a specific crank angle in a speed transition period from when the internal combustion engine is started to when an engine speed settles down to a certain speed as a reference crank angle and setting a plurality of crank angles arriving successively after said reference crank angle during said speed transition period as judgment use crank angles;
 a storing means for detecting and storing in advance a reference crank angle advancing time, said reference crank angle advancing time being a crank angle advancing time when a reference fuel is used, said crank angle advancing being a time required for the crank angle to advance from said reference crank angle to each judgment use crank angle;
 a detecting means for detecting actual crank angle advancing times during the speed transition period; and
 a control means, which controls an ignition timing or fuel injection amount during said speed transition period, for retarding an ignition timing or reducing a fuel injection amount by an amount corresponding to a difference of the actual crank angle advancing time from the reference crank angle advancing time when the actual crank angle advancing time is shorter than the reference crank angle advancing time and for advancing the ignition timing or increasing the fuel injection amount by an amount corresponding to a difference of the actual crank angle advancing time from the reference crank angle advancing time when the actual crank angle advancing time is longer than the reference crank angle advancing time.

2. A startup control device for an internal combustion engine as set forth in claim 1, wherein, in the speed transition period, the engine speed rises to a speed peak value, then descends and settles down at said certain speed, and said device further comprises:
a means for calculating a fuel property indicator indicating a property of the actually used fuel based on a correction amount of said ignition timing or fuel injection amount;
a means for predicting a speed peak value based on said fuel property indicator;
a means for detecting an actual speed peak value;
a means for calculating a first frictional torque component based on a difference of an actual speed peak value from said predicted speed peak value;
a means for predicting an angular acceleration of the crankshaft in the speed transition period when the engine speed passes the speed peak value, then the engine speed descends, based on said fuel property indicator;
a means for detecting an angular acceleration of the crankshaft when the engine speed actually descends;
a means for calculating a second frictional torque based on a difference of an actual angular acceleration from said predicted angular acceleration;
a means for predicting a frictional torque based on the first frictional torque component and the second frictional torque component; and
a means for controlling an intake air amount based on the predicted frictional torque.

3. A startup control device for an internal combustion engine as set forth in claim 2, wherein said means for predicting the fuel property indicator further comprises:
a means for predicting a crank angle advancing time based on a correction amount of said ignition timing or fuel injection amount;
a means for detecting actual crank angle advancing times;
a means for calculating the differences of the actual crank angle advancing times from the predicted crank angle advancing time; and
a means for calculating the cumulative value of the differences and calculating the fuel property indicator based on said cumulative value.

4. A startup control device for an internal combustion engine as set forth in claim 2, wherein said means for calculating the fuel property indicator further comprises:
a means for predicting speed rises based on a correction amount of said ignition timing or fuel injection amount;
a means for detecting actual speed rises;
a means for calculating differences of the actual speed rises from the predicted speed rises; and
a means for calculating a cumulative value of the differences and for calculating a fuel property indicator based on said cumulative value.

5. A startup control device for an internal combustion engine as set forth in claim 2, wherein said means for calculating the fuel property indicator further comprises:
a means for predicting an angular acceleration cumulative value based on a correction amount of said ignition timing or fuel injection amount;
a means for detecting actual angular acceleration cumulative values;
a means for calculating the differences of the actual angular acceleration cumulative values from the predicted angular acceleration cumulative value; and
a means for calculating a cumulative value of the differences and for calculating a fuel property indicator based on said cumulative value.

6. A startup control device for an internal combustion engine as set forth in claim 1, wherein the internal combustion engine repeatedly executes an engine cycle comprised of four strokes of an intake stroke, compression stroke, power stroke, and exhaust stroke and a crank angle in an engine cycle where the air-fuel mixture first burns in the speed transition period is set as a reference crank angle.

7. A startup control device for an internal combustion engine as set forth in claim 6, wherein the crank angles in the engine cycles successively executed after the engine cycle where the air-fuel mixture is first burned are set as said judgment use crank angles.

8. A startup control device for an internal combustion engine as set forth in claim 6, wherein the reference crank angle and judgment use crank angle are set as the compression top dead centers in the corresponding engine cycle.

9. A startup control device for an internal combustion engine as set forth in claim 1, wherein the internal combustion engine has a plurality of cylinders, each cylinder repeatedly performs an engine cycle comprised of the four strokes of an intake stroke, compression stroke, power stroke, and exhaust stroke, and the crank angle in the engine cycle of the cylinder where the air-fuel mixture first burns in the speed transition period is set as the reference crank angle.

10. A startup control device for an internal combustion engine as set forth in claim 9, wherein the engine cycles of the cylinders are executed offset by predetermined crank angles from each other, and the crank angles in the engine cycles of the cylinders successively started after the engine cycle of the cylinder where the air-fuel mixture first burns are made said judgment use crank angles.

11. A startup control device for an internal combustion engine as set forth in claim 9, wherein the reference crank angle and judgment use crank angle are set as the compression top dead centers in the corresponding engine cycle.

12. A startup control device for an internal combustion engine as set forth in claim 1, wherein said reference fuel is made from a heaviest fuel among fuels envisioned as being used in the internal combustion engine.

13. A startup control device for an internal combustion engine, comprising:
a setting means for setting a specific crank angle in a speed transition period from when the internal combustion engine is started to when an engine speed settles down to a certain speed as a reference crank angle and setting a plurality of crank angles arriving successively after said reference crank angle during said speed transition period as judgment use crank angles;
a storing means for detecting and storing in advance a reference speed rise, said reference speed rise being a speed rise when a reference fuel is used, said speed rise being an amount of rise of engine speed occurring when the crank angle advances from said reference crank angle to each judgment use crank angle;
a detecting means for detecting actual speed rises during the speed transition period; and
a control means, which controls an ignition timing or fuel injection amount during said speed transition period, for retarding an ignition timing or reducing a fuel injection amount by an amount corresponding to a difference of the actual speed rise from the reference speed rise when the actual speed rise is larger than the reference speed rise and for advancing the ignition timing or increasing the fuel injection amount by an amount corresponding to a difference of the actual speed rise from the reference speed rise when the actual speed rise is smaller than the reference speed rise.

14. A startup control device for an internal combustion engine as set forth in claim 13, wherein, in the speed transition period, the engine speed rises to a speed peak value, then descends and settles down at said certain speed, and said device further comprises:
   a means for calculating a fuel property indicator indicating a property of the actually used fuel based on a correction amount of said ignition timing or fuel injection amount;
   a means for predicting a speed peak value based on said fuel property indicator;
   a means for detecting an actual speed peak value;
   a means for calculating a first frictional torque component based on a difference of an actual speed peak value from said predicted speed peak value;
   a means for predicting an angular acceleration of the crankshaft in the speed transition period when the engine speed passes the speed peak value, then the engine speed descends, based on said fuel property indicator;
   a means for detecting an angular acceleration of the crankshaft when the engine speed actually descends;
   a means for calculating a second frictional torque based on a difference of an actual angular acceleration from said predicted angular acceleration;
   a means for predicting a frictional torque based on the first frictional torque component and the second frictional torque component; and
   a means for controlling an intake air amount based on the predicted frictional torque.

15. A startup control device for an internal combustion engine as set forth in claim 14, wherein said means for predicting the fuel property indicator further comprises:
   a means for predicting a crank angle advancing time based on a correction amount of said ignition timing or fuel injection amount;
   a means for detecting actual crank angle advancing times;
   a means for calculating the differences of the actual crank angle advancing times from the predicted crank angle advancing time; and
   a means for calculating the cumulative value of the differences and calculating the fuel property indicator based on said cumulative value.

16. A startup control device for an internal combustion engine as set forth in claim 14, wherein said means for calculating the fuel property indicator further comprises:
   a means for predicting speed rises based on a correction amount of said ignition timing or fuel injection amount;
   a means for detecting actual speed rises;
   a means for calculating differences of the actual speed rises from the predicted speed rises; and
   a means for calculating a cumulative value of the differences and for calculating a fuel property indicator based on said cumulative value.

17. A startup control device for an internal combustion engine as set forth in claim 14, wherein said means for calculating the fuel property indicator further comprises:
   a means for predicting an angular acceleration cumulative value based on a correction amount of said ignition timing or fuel injection amount;
   a means for detecting actual angular acceleration cumulative values;
   a means for calculating the differences of the actual angular acceleration cumulative values from the predicted angular acceleration cumulative value; and
   a means for calculating a cumulative value of the differences and for calculating a fuel property indicator based on said cumulative value.

18. A startup control device for an internal combustion engine as set forth in claim 13, wherein the internal combustion engine repeatedly executes an engine cycle comprised of four strokes of an intake stroke, compression stroke, power stroke, and exhaust stroke and a crank angle in an engine cycle where the air-fuel mixture first burns in the speed transition period is set as a reference crank angle.

19. A startup control device for an internal combustion engine as set forth in claim 18, wherein the crank angles in the engine cycles successively executed after the engine cycle where the air-fuel mixture is first burned are set as said judgment use crank angles.

20. A startup control device for an internal combustion engine as set forth in claim 18, wherein the reference crank angle and judgment use crank angle are set as the compression top dead centers in the corresponding engine cycle.

21. A startup control device for an internal combustion engine as set forth in claim 13, wherein the internal combustion engine has a plurality of cylinders, each cylinder repeatedly performs an engine cycle comprised of the four strokes of an intake stroke, compression stroke, power stroke, and exhaust stroke, and the crank angle in the engine cycle of the cylinder where the air-fuel mixture first burns in the speed transition period is set as the reference crank angle.

22. A startup control device for an internal combustion engine as set forth in claim 21, wherein the engine cycles of the cylinders are executed offset by predetermined crank angles from each other, and the crank angles in the engine cycles of the cylinders successively started after the engine cycle of the cylinder where the air-fuel mixture first burns are made said judgment use crank angles.

23. A startup control device for an internal combustion engine as set forth in claim 21, wherein the reference crank angle and judgment use crank angle are set as the compression top dead centers in the corresponding engine cycle.

24. A startup control device for an internal combustion engine as set forth in claim 13, wherein said reference fuel is made from a heaviest fuel among fuels envisioned as being used in the internal combustion engine.

25. A startup control device for an internal combustion engine, comprising:
   a setting means for setting a specific crank angle in a speed transition period from when the internal combustion engine is started to when an engine speed settles down to a certain speed as a reference crank angle and setting a plurality of crank angles arriving successively after said reference crank angle during said speed transition period as judgment use crank angles;
   a storing means for detecting and storing in advance an angular acceleration cumulative value when a reference fuel is used, said angular acceleration cumulative value being a value of an angular acceleration of a crankshaft at said reference crank angle to which an angular acceleration of the crankshaft at each judgment use crank angle is successively cumulatively added;
   a detecting means for detecting actual angular acceleration cumulative values during the speed transition period; and
   a control means, which controls an ignition timing or fuel injection amount during said speed transition period, for retarding an ignition timing or reducing a fuel injection amount by an amount corresponding to a difference of an actual angular acceleration cumulative value from a reference angular acceleration cumulative value when the actual angular acceleration cumulative value is larger than the reference angular acceleration cumulative value and for advancing the ignition timing or increasing the fuel injection amount by an amount corresponding to a difference of the actual angular acceleration cumulative value from the reference angular acceleration cumulative value when the actual angular acceleration cumulative value is smaller than the reference angular acceleration cumulative value.

26. A startup control device for an internal combustion engine as set forth in claim 25, wherein, in the speed transition period, the engine speed rises to a speed peak value, then descends and settles down at said certain speed, and said device further comprises:
a means for calculating a fuel property indicator indicating a property of the actually used fuel based on a correction amount of said ignition timing or fuel injection amount;
a means for predicting a speed peak value based on said fuel property indicator;
a means for detecting an actual speed peak value;
a means for calculating a first frictional torque component based on a difference of an actual speed peak value from said predicted speed peak value;
a means for predicting an angular acceleration of the crankshaft in the speed transition period when the engine speed passes the speed peak value, then the engine speed descends, based on said fuel property indicator;
a means for detecting an angular acceleration of the crankshaft when the engine speed actually descends;
a means for calculating a second frictional torque based on a difference of an actual angular acceleration from said predicted angular acceleration;
a means for predicting a frictional torque based on the first frictional torque component and the second frictional torque component; and
a means for controlling an intake air amount based on the predicted frictional torque.

27. A startup control device for an internal combustion engine as set forth in claim 26, wherein said means for predicting the fuel property indicator further comprises:
a means for predicting a crank angle advancing time based on a correction amount of said ignition timing or fuel injection amount;
a means for detecting actual crank angle advancing times;
a means for calculating the differences of the actual crank angle advancing times from the predicted crank angle advancing time; and
a means for calculating the cumulative value of the differences and calculating the fuel property indicator based on said cumulative value.

28. A startup control device for an internal combustion engine as set forth in claim 26, wherein said means for calculating the fuel property indicator further comprises:
a means for predicting speed rises based on a correction amount of said ignition timing or fuel injection amount;
a means for detecting actual speed rises;
a means for calculating differences of the actual speed rises from the predicted speed rises; and
a means for calculating a cumulative value of the differences and for calculating a fuel property indicator based on said cumulative value.

29. A startup control device for an internal combustion engine as set forth in claim 26, wherein said means for calculating the fuel property indicator further comprises:
a means for predicting an angular acceleration cumulative value based on a correction amount of said ignition timing or fuel injection amount;
a means for detecting actual angular acceleration cumulative values;
a means for calculating the differences of the actual angular acceleration cumulative values from the predicted angular acceleration cumulative value; and
a means for calculating a cumulative value of the differences and for calculating a fuel property indicator based on said cumulative value.

30. A startup control device for an internal combustion engine as set forth in claim 25, wherein the internal combustion engine repeatedly executes an engine cycle comprised of four strokes of an intake stroke, compression stroke, power stroke, and exhaust stroke and a crank angle in an engine cycle where the air-fuel mixture first burns in the speed transition period is set as a reference crank angle.

31. A startup control device for an internal combustion engine as set forth in claim 30, wherein the crank angles in the engine cycles successively executed after the engine cycle where the air-fuel mixture is first burned are set as said judgment use crank angles.

32. A startup control device for an internal combustion engine as set forth in claim 30, wherein the reference crank angle and judgment use crank angle are set as the compression top dead centers in the corresponding engine cycle.

33. A startup control device for an internal combustion engine as set forth in claim 25, wherein the internal combustion engine has a plurality of cylinders, each cylinder repeatedly performs an engine cycle comprised of the four strokes of an intake stroke, compression stroke, power stroke, and exhaust stroke, and the crank angle in the engine cycle of the cylinder where the air-fuel mixture first burns in the speed transition period is set as the reference crank angle.

34. A startup control device for an internal combustion engine as set forth in claim 33, wherein the engine cycles of the cylinders are executed offset by predetermined crank angles from each other, and the crank angles in the engine cycles of the cylinders successively started after the engine cycle of the cylinder where the air-fuel mixture first burns are made said judgment use crank angles.

35. A startup control device for an internal combustion engine as set forth in claim 33, wherein the reference crank angle and judgment use crank angle are set as the compression top dead centers in the corresponding engine cycle.

36. A startup control device for an internal combustion engine as set forth in claim 25, wherein said reference fuel is made from a heaviest fuel among fuels envisioned as being used in the internal combustion engine.

* * * * *

UNITED STATES PATENT AND TRADEMARK OFFICE
CERTIFICATE OF CORRECTION

PATENT NO. : 7,822,536 B2
APPLICATION NO. : 12/304700
DATED : October 26, 2010
INVENTOR(S) : Kota Sata et al.

It is certified that error appears in the above-identified patent and that said Letters Patent is hereby corrected as shown below:

| Column | Line | |
|---|---|---|
| 9 | 45 | Change "can to set" to --can be set--. |
| 10 | 8 | Change "i>IM" to --i>iM--. |
| 14 | 23 | Change "a and b weighting" to --$\underline{a}$ and $\underline{b}$ weighting--. |
| 20 | 52 | Change "advancing being" to --advancing time being--. |
| 21 | 3 | Change "A startup" to --The startup--. |
| 21 | 32 | Change "A startup" to --The startup--. |
| 21 | 45 | Change "A startup" to --The startup--. |
| 21 | 57 | Change "A startup" to --The startup--. |
| 22 | 4 | Change "A startup" to --The startup--. |
| 22 | 11 | Change "A startup" to --The startup--. |
| 22 | 16 | Change "A startup" to --The startup--. |
| 22 | 20 | Change "A startup" to --The startup--. |
| 22 | 28 | Change "A startup" to --The startup--. |
| 22 | 35 | Change "A startup" to --The startup--. |
| 22 | 39 | Change "A startup" to --The startup--. |
| 23 | 4 | Change "A startup" to --The startup--. |
| 23 | 32 | Change "A startup" to --The startup--. |
| 23 | 45 | Change "A startup" to --The startup--. |
| 23 | 57 | Change "A startup" to --The startup--. |
| 24 | 4 | Change "A startup" to --The startup--. |
| 24 | 11 | Change "A startup" to --The startup--. |
| 24 | 16 | Change "A startup" to --The startup--. |

Signed and Sealed this
Thirty-first Day of July, 2012

David J. Kappos
*Director of the United States Patent and Trademark Office*

CERTIFICATE OF CORRECTION (continued)
U.S. Pat. No. 7,822,536 B2

| Column | Line | |
|---|---|---|
| 24 | 20 | Change "A startup" to --The startup--. |
| 24 | 28 | Change "A startup" to --The startup--. |
| 24 | 35 | Change "A startup" to --The startup--. |
| 24 | 39 | Change "A startup" to --The startup--. |
| 25 | 10 | Change "A startup" to --The startup--. |
| 25 | 38 | Change "A startup" to --The startup--. |
| 25 | 51 | Change "A startup" to --The startup--. |
| 26 | 4 | Change "A startup" to --The startup--. |
| 26 | 18 | Change "A startup" to --The startup--. |
| 26 | 25 | Change "A startup" to --The startup--. |
| 26 | 30 | Change "A startup" to --The startup--. |
| 26 | 34 | Change "A startup" to --The startup--. |
| 26 | 42 | Change "A startup" to --The startup--. |
| 26 | 49 | Change "A startup" to --The startup--. |
| 26 | 53 | Change "A startup" to --The startup--. |